US012619635B2

(12) United States Patent (10) Patent No.: US 12,619,635 B2

Kumar et al. (45) **Date of Patent: *May 5, 2026**

(54) METHODS AND SYSTEMS FOR SUPPLY CHAIN ANALYTICS USING VISUALIZATIONS AND STANDARDIZATION CONSTRUCTS

(71) Applicant: McKesson Corporation, Irving, TX (US)

(72) Inventors: Anshul Kumar, Glen Allen, VA (US); Bethann Maynard, Mechanicsville, VA (US); Jacob Hookom, Chaska, MN (US)

(73) Assignee: McKesson Corporation, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,392

(22) Filed: Mar. 13, 2024

(65) Prior Publication Data

US 2024/0220515 A1 Jul. 4, 2024

Related U.S. Application Data

(63) Continuation of application No. 16/370,174, filed on Mar. 29, 2019, now Pat. No. 11,960,511.

(51) Int. Cl.
*G06F 16/28* (2019.01)
*G06F 16/22* (2019.01)
*G06F 16/242* (2019.01)

(52) U.S. Cl.
CPC ........ *G06F 16/287* (2019.01); *G06F 16/2282* (2019.01); *G06F 16/243* (2019.01)

(58) Field of Classification Search
CPC ...... G06F 16/35; G06F 16/353; G06F 16/355; G06F 16/287; G06F 16/2282; G06F 16/243
See application file for complete search history.

(56) References Cited

U.S. PATENT DOCUMENTS

| | | | |
|---|---|---|---|
| 9,652,794 B2 * | 5/2017 | Ochiai | ............... G06Q 30/0603 |
| 9,830,635 B1 | 11/2017 | Levy et al. | |
| 2013/0110838 A1 | 5/2013 | Lidy et al. | |

FOREIGN PATENT DOCUMENTS

WO 2011125787 10/2011

OTHER PUBLICATIONS

Human Translation of Figure 15 of WO/2011/125787 document originaly cited in PTO-892 dated Mar. 25, 2021. Human translation done Nov. 3, 2021, WO/2011/125787 Published: Oct. 13, 2011 (Year: 2021).

* cited by examiner

*Primary Examiner* — Amanda L Willis

(74) *Attorney, Agent, or Firm* — Ballard Spahr LLP

(57) ABSTRACT

Provided are methods, systems, and apparatuses for improving supply chain management interfaces and functionality. The supply chain management interfaces may provide visualizations of one or more standardization constructs associated with an organization and locations thereof. A standardization construct may be generated using supply chain records associated with the organization and locations thereof. The visualizations of the one or more standardization constructs may be adjusted at a user interface. The adjusted one or more standardization constructs may be indicative of ways in which the one or more standardization constructs may be improved.

20 Claims, 28 Drawing Sheets

| ANALYTICS SEARCH ENGINE 312 |
| POTENTIAL SEARCH RESULTS 602 | SEARCH RESULTS 604 | DATA PROFILE 606 |

700

702

RECEIVE A QUERY TYPE

704

INITIATE SEARCH RESPONSE TO THE QUERY TYPE

706

ACCESS STANDARDIZATION CONSTRUCT

708

IDENTIFY SEARCH RESULTS BASED ON THE STANDARDIZATION CONSTRUCT

710

OUTPUT THE SEARCH RESULTS

800

802

SELECT ~804

PRESENT STATE HEADER 806

PREVIOUS STATE HEADER 808

PRESENT RESULTS 810

Health Systems Standardization $276.948    1.170    75.1%
Total Spend   # of Products   Score

PREVIOUS RESULTS 812

Health Systems Standardization $16,546    50    57%
Total Spend   # of Products   Score

PAGE INDICATOR 814

1000

1002

SPECIALITY GROUP     RESULTS ~1004     1006

Health Systems Standardization

Vaccines     Rx     Lab Testing     Needles/ Syringes     Gloves $276,948          1,170          75.1%

Total Spend     # of Products     Score

| Account | Name | Score | Products | N.S. Spend | Total |
|---------|------|-------|----------|-----------|-------|
| 41242 | Union Srv. | 91.5% | 32 | $30,256 | $33,851 |
| 400752 | Akron Gen. | 69% | 392 | $20,115 | $41,691 |

1100

1102

RECEIVE DATA RELATED TO A DOMAIN

1104

RECEIVE WEIGHT ASSOCIATED WITH DOMAIN

1106

RECEIVE PEER COMPONMENT RELATED TO THE DATA

1108

RECEIVE TIME COMPONENT RELATED TO THE DATA

1110

GENERATE STANDARDIZATION CONSTRUCT

1200

1202

RECEIVE BATCH INFORMATION

1204

EXTRACT DATA FOR ONE OR MORE DOMAINS

1206

ANALYZE DATA FOR THE ONE OR MORE DOMAINS

1208

GENERATE STANDARDIZATION CONSTRUCT

1300

1302

GATHER DATA FROM ONE OR MORE ORGANIZATION ENTITIES

1304

ANALYZE DATA FROM ONE OR MORE ORGANIZATION ENTITIES

1306

GENERATE STANDARDIZATION CONSTRUCT

1500

1502

GATHER DATA RELATED TO ONE OR MORE PURCHASE ORDERS

1504

ANALYZE DATA FROM ONE OR MORE PURCHASE ORDERS

1506

UPDATE STANDARDIZATION CONSTRUCT

1600

1605

RECEIVE QUERY SELECTION

1604

PROVIDE QUERY SELECTION TO FIRST SEARCH ENGINE

1606

RECEIVE FIRST SET OF SEARCH RESULTS FROM FIRST SEARCH ENGINE

1608

ACCESS STANDARDIZATION CONSTRUCT

1610

FILTER FIRST SET OF SEARCH RESULTS WITH STANDARDIZATION CONSTRUCT

1612

PROVIDE SECOND SET OF SEARCH RESULTS

1700

1702

RECEIVE QUERY SELECTION

1704

ACCESS STANDARDIZATION CONSTRUCT

1706

PERFORM SEARCH USING QUERY SELECTION

1708

PROVIDE SET OF SEARCH RESULTS

1800

1802

RECEIVE DATA RELATED TO ONE OR MORE PRODUCTS

1804

DETERMINE ONE OR MORE ATTRIBUTES FOR EACH OF THE ONE OR MORE PRODUCTS

1806

DETERMINE ONE OR MORE ALTERNATIVE PRODUCTS FOR EACH OF THE ONE OR MORE PRODUCTS

1808

DETERMINE A UNIT COST FOR AT LEAST ONE OF THE ALTERNATIVE PRODUCTS

1900

1902

RECEIVE DATA RELATED TO AN ORGANIZATION ENTITY

1904

DETERMINE A TYPE OF THE ORGANIZATION ENTITY

1906

GENERATE ONE OR MORE
STANDARDIZATION SCORES FOR THE ORGANIZATION ENTITY

2000

2002

IDENTIFY A PLURALITY OF SUPPLIES
RELATED TO AN ORGANIZATION ENTITY

2004

DETERMINE FREQUENCY OF OCCURRENCE OF
EACH OF THE PLURALITY OF SUPPLIES

2006

DETERMINE A SUBSET OF PLURALITY OF SUPPLIES

2008

PROCESS THE SUBSET ACCORDING TO A DETERMINED ONTOLOGY

2010

GENERATE A DATA PROFILE FOR A QUERY SELECTION
BASED ON THE PROCESSED SUBSET

2012

INDEX THE DATA PROFILE

2100

2102

RECEIVE A SET OF QUERY RESULTS GENERATED BASED ON A STANDARDIZATION CONSTRUCT

2104

RECEIVE AN ADJUSTMENT FOR AT LEAST ONE OF A PEER COMPONENT OR A TIME COMPONENT

2106

UPDATE THE SET OF QUERY RESULTS BASED ON THE ADJUSTMENT

2108

PRESENT UPDATED SET OF QUERY RESULTS

2200

2202

PERFORM A SEARCH FOR A QUERY SELECTION

2204

DETERMINE A PLURALITY OF STANDARDIZATION CONSTRUCTS

2206

DETERMINE A FIRST AND A SECOND STANDARDIZATION CONSTRUCT

2208

DETERMINE A DIFFERENCE BETWEEN THE FIRST STANDARDIZATION CONSTRUCT AND THE SECOND STANDARDIZATION CONSTRUCT

2210

PERFORM A SEARCH FOR THE QUERY SELECTION BASED ON THE DIFFERENCE

2300

2302

RECEIVE A FIRST STANDARDIZATION CONSTRUCT

2304

PERFORM A CLUSTERING OPERATION

2306

IDENTIFY ONE OR MORE CLUSTERS

2308

GENERATE A DESCRIPTION OF EACH OF THE ONE OR MORE CLUSTERS

2310

PROVIDE A SEARCHABLE DATABASE

2400

2402

RECEIVE A QUERY SELECTION

2404

IDENTIFY ONE OR MORE CLUSTERS
RELATED TO THE QUERY SELECTION

2406

UPDATE A STANDARDIZATION CONSTRUCT BASED ON ONE OR MORE
CHANGES IN ONE OR MORE OF THE CLUSTERS

2500 ⌐ FIG. 25 ⌐ 2502

ASSOCIATE EACH OF A PLURALITY OF PRODUCT IDENTIFIERS WITH A FIRST PRODUCT CLUSTER IDENTIFIER

2504

DETERMINE ONE OR MORE SUBSTITUTE PRODUCT IDENTIFIERS

2506

DETERMINE A PLURALITY OF ATTRIBUTES ASSOCIATED WITH EACH PRODUCT IDENTIFIER

2508

DETERMINE ONE OR MORE ORPHAN PRODUCT IDENTIFIERS

2510

EXECUTE A SANITY CHECK FOR EACH PRODUCT CLUSTER IDENTIFIER

2600

2602

RECEIVE A FIRST PLURALITY OF SERVICE LOCATION IDENTIFIERS

2604

RECEIVE ENRICHMENT DATA

2606

GENERATE ONE OR MORE CUSTOMER CLUSTER IDENTIFIERS

2608

RECEIVE A PLURALITY OF TRANSACTION RECORDS

2610

ASSOCIATE EACH OF A PLURALITY OF PRODUCT IDENTIFIERS
WITH A PRODUCT CLUSTER IDENTIFIER

Figure 27:
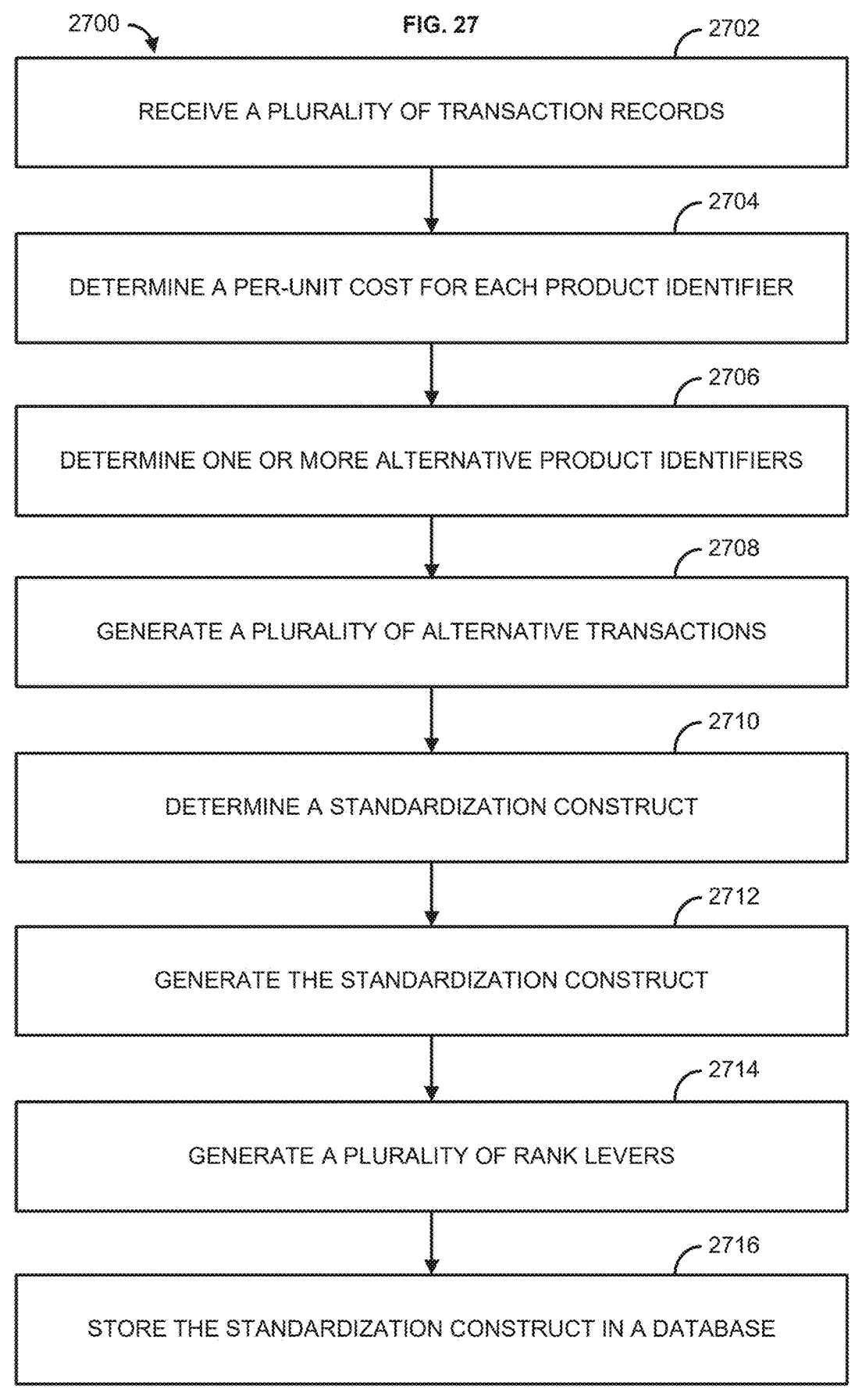

RECEIVE A PLURALITY OF TRANSACTION RECORDS

2704

DETERMINE A PER-UNIT COST FOR EACH PRODUCT IDENTIFIER

2706

DETERMINE ONE OR MORE ALTERNATIVE PRODUCT IDENTIFIERS

2708

GENERATE A PLURALITY OF ALTERNATIVE TRANSACTIONS

2710

DETERMINE A STANDARDIZATION CONSTRUCT

2712

GENERATE THE STANDARDIZATION CONSTRUCT

2714

GENERATE A PLURALITY OF RANK LEVERS

2716

STORE THE STANDARDIZATION CONSTRUCT IN A DATABASE

2800

2802

RECEIVE A PLURALITY OF RECORDS ASSOCIATED WITH AN ORGANIZATION IDENTIFIER

2804

DETERMINE ONE OR MORE PRODUCT CLUSTERS

2806

ASSOCIATE A PLURALITY OF PRODUCT IDENTIFIERS WITH AT LEAST ONE LOCATION IDENTIFIER

2808

GENERATE A STANDARDIZATION CONSTRUCT

2810

RECEIVE A SEARCH QUERY

2812

PROVIDE A VISUALIZATION COMPRISING THE STANDARDIZATION CONSTRUCT

METHODS AND SYSTEMS FOR SUPPLY CHAIN ANALYTICS USING VISUALIZATIONS AND STANDARDIZATION CONSTRUCTS

CROSS-REFERENCE TO RELATED APPLICATION

This application is a continuation of U.S. application Ser. No. 16/370,174, filed on Mar. 29, 2019, the entirety of which is incorporated by reference herein.

BACKGROUND

The expanded use of customer relationship management (CRM) and supply chain management (SCM) software has allowed organizations to quickly gain access to a significant amount of information for numerous, and even granular, aspects of their supply chain and organizational operations. Unfortunately, what often results from existing CRM and SCM software is irrelevant and/or overly complicated information being reported. These drawbacks prevent an organization from easily making simple yet effective changes to their supply chain and organizational operations. These and other shortcomings are addressed by the present disclosure.

SUMMARY

It is to be understood that both the following general description and the following detailed description are exemplary and explanatory only and are not restrictive. Provided are methods, systems, and apparatuses comprising receiving data related to a domain of a plurality of domains, determining a weight associated with the domain, receiving a peer component related to the data, the receiving a time component related to the data, and generating a standardization construct based on the data, the domain, the weight, the peer component, and the time component. Also provided are methods, systems, and apparatuses comprising receiving supply chain information for an organization entity as a batch, extracting data for one or more domains related to the organization entity, analyzing data for the one or more domains, and generating a standardization construct based on the analyzed data for the one or more domains. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and, together with the description, serve to explain the principles of the methods, systems, and apparatuses described herein:

FIG. 6 shows a block diagram of an example search engine index;

FIG. 27 shows a flowchart of an example method; and

DETAILED DESCRIPTION

Figure 1:
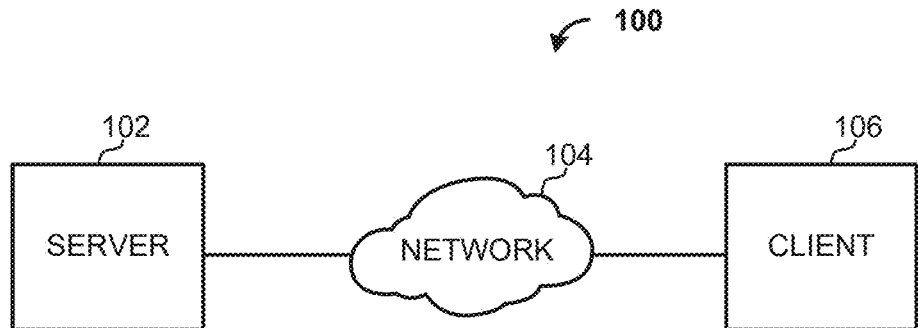
FIG. 1 shows a block diagram of an example client/server environment.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

As will be described in greater detail herein, the systems, methods, and apparatuses provided herein may perform data analytics for an entity of an organization, such as a practice group of a medical services provider. The systems, methods, and apparatuses may also provide a user interface allowing a user to perform a search to generate analytics data. In an aspect, the search may be an "analytics search," which may refer to a search that generates search results based on a selected one or more organization entities and a time period (e.g., the previous 12 months). In an aspect, an analytics search may take into account one or both of how the selected one or more organization entities has performed in a present timeframe (e.g., a present state) as well as a prior timeframe (e.g., a previous state). The present timeframe and the prior timeframe may be of equal duration. Performance for either timeframe for the selected one or more organization entities may be embodied in one or more standardization constructs. A standardization construct may comprise a data structure, such as an array, a list, a tree, combinations thereof, and the like. The data structure may be configured for searching and/or filtering one or more search results and/or one or more search queries. The standardization construct may comprise information in one or more domains (e.g., practice group, office, an organization overall, etc.). For example, a standardization construct may comprise one or more of an efficiency domain, an automation domain, a cost sourcing domain, an organization entity domain, combinations thereof, and the like. Information related to the organization may be within the one or more domains. The one or more domains may each comprise a weight that comprises a value indicative of an importance of the domain. The standardization construct may comprise a time component that comprises a value indicative of an amount of time associated with the data. For example, a user may indicate that information within a domain and/or the domain itself is associated with a particular time frame (e.g., 1 day, 1 month, 1 year, 10 years, etc.). A standardization construct may comprise a peer component that comprises a value indicative of a level of relative achievement of an organization entity associated with the data as compared to one or more peer entities. For example, a peer component value for an organization entity may be 90% as compared to a peer entity (e.g., the peer entity is performing better, relatively speaking, in the associated domain).

The analytics search may be performed by an analytics search engine configured to find information stored on a computer network such as the Internet, an intranet, a server farm, a personal computer, etc. The analytics search engine may use regularly updated indexes to operate quickly and efficiently (e.g., batch information collected for an organization on a routine basis). The analytics search engine may refer to a web-based search engine, which searches for information on an intranet, private server, database, etc. Additionally, the analytics search engine may be an enterprise search engine, which searches on intranets, personal search engines, which searches individual personal computers, a mobile search engine, and/or combinations thereof.

The analytics search engine may operate algorithmically to crawl electronic documents, index the electronic documents, and search the index. The analytics search engine may retrieve a list of search results responsive to a search query. The search query may be user-defined or system-defined. The search query may comprise one or more query types. A system-defined query type may be, for example, a selection by a user, via a user interface, of one or more of the queries listed below:

| | |
|---|---|
| Accounts Payable | Fill Rates |
| Care Setting by Specialty | Medical Supply Spend Management |
| Conversion Opportunities | Order Efficiency |
| Adjusted PPD Spend Management | Order Source Analysis |
| Cost Source | Office Supply Spend Management |
| Equipment Spend Management | PPD Spend Management |
| Formulary Compliance | PPD Trend (not available by NSC) |
| Peer Benchmarking (Health Systems roll up or Care Setting/Specialty) | Rx Spend Management |
| Incontinence Spend Facility Detail | Savings Opportunities |
| Incontinence Spend Management | Spend Management |
| Lab Contract Compliance | Spend Variance |
| Lab Spend | Standardization |

Each of the system-defined queries may return search results that comprise charts or graphs detailing certain aspects of a given organization entity's performed with respect to the selected query. A search query may also comprise a keyword, a phrase, a product name, an entity and/or organization name, combinations thereof, and the like. Search results may be any electronic file, including by way of example and not meant to limiting, Active Server Page script files, Bitmap image files, Cold Fusion script files, Common Gateway Interface script/program files, Cascading Style Sheet markup files, Comma Separated Value text files, Dynamic HyperText Markup Language files, Microsoft Word Document files, Graphics Interchange Format image files, HyperText Markup Language (HTM or HTML) files, Joint Photographic Experts Group image files, Adobe Acrobat Portable Document Files, Perl script files, Portable Network Graphics image files, Rich Text Format document files, Tagged Image File Format image files, Plain Text files, Extensible Markup Language files, combinations thereof, and the like. Each of the system-defined queries may return search results that comprise charts or graphs detailing certain aspects of a given organization entity's performed with respect to the selected query. A search query may also comprise a keyword, a phrase, a product name, an entity and/or organization name, combinations thereof, and the like. Search results may be any electronic file, including by way of example and not meant to limiting, Active Server Page script files, Bitmap image files, Cold Fusion script files, Common Gateway Interface script/program files, Cascading Style Sheet markup files, Comma Separated Value text files, Dynamic HyperText Markup Language files, Microsoft Word Document files, Graphics Interchange Format image files, HyperText Markup Language (HTM or HTML) files, Joint Photographic Experts Group image files, Adobe Acrobat Portable Document Files, Perl script files, Portable Network Graphics image files, Rich Text Format document files, Tagged Image File Format image files, Plain Text files, Extensible Markup Language files, combinations thereof, and the like. Search results may be transmitted over the World Wide Web utilizing the Hypertext Transfer Protocol (HTTP) or HTTPS, which is the secure version of HTTP. Search results may have an address (Uniform Resource Indicator (URI)) which appears in the address bar of a web browser. Addresses may have prefixes of which HTTP and HTTPS are two kinds. HTTP is the set of rules for exchanging electronic files (text, graphic images, sound, video, and other multimedia files) on the World Wide Web. Relative to the TCP/IP suite of protocols (which are the basis for information exchange on the Internet), HTTP is an application protocol. HTTP is the most popular URI scheme used on the World Wide Web. The HTTP scheme defines the scheme-specific part of its absolute URI as a string of characters beginning with two slashes, followed by authority (host name with optional port number, separated by a column), followed by an optional path part, and followed by an optional query part, separated from the previous part with a question mark.

The secure hypertext transfer protocol (HTTPS) is a communications protocol designed to transfer encrypted information between computers over the World Wide Web. HTTPS is HTTP using a Secure Socket Layer (SSL). HTTPS is a URI scheme equivalent to the http scheme. It signals the web browser to use HTTP with added encryption layer of SSL/TLS to protect the traffic. SSL is especially suited for HTTP since it may provide some protection even if only one side to the communication is authenticated.

Figure 2:
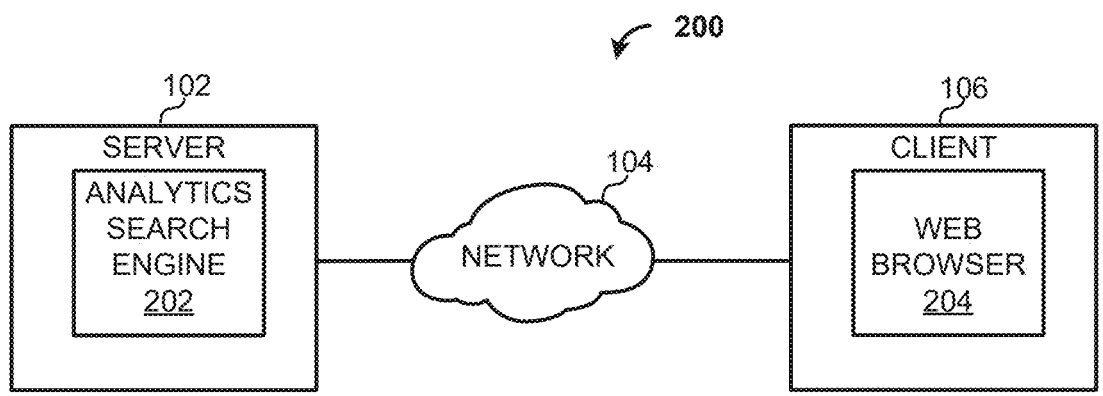
FIG. 2 shows a block diagram of an example client/server environment.
Figure 3:
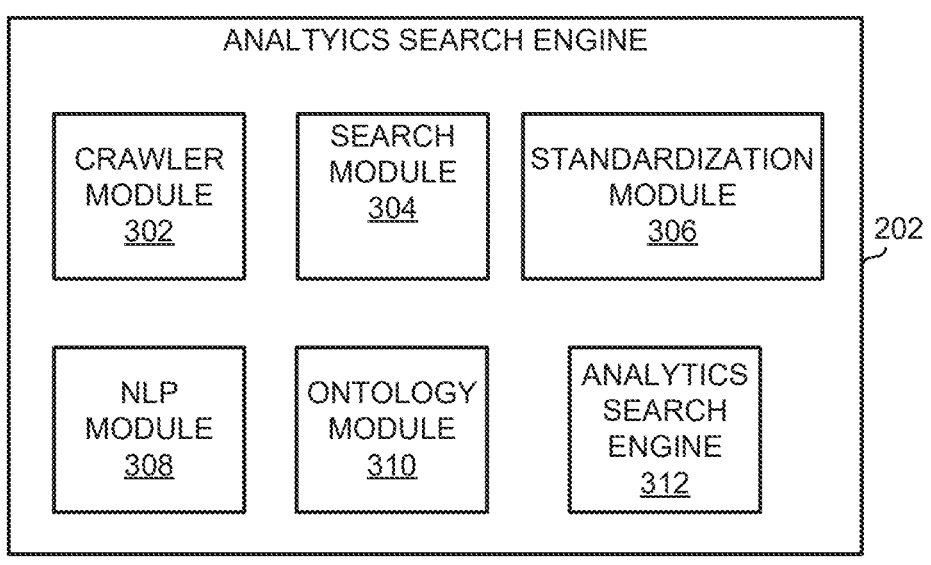
FIG. 3 shows a block diagram of an example search engine.

FIG. 1 and FIG. 2 are block diagrams depicting non-limiting examples of a server 102 and a client 106 connected through a network 104 according to an aspect. The server 102 may comprise one or multiple computers configured to operate an analytics search engine 202, as shown in FIG. 3. The client 106 may comprise one or multiple computers configured to operate a web browser 204 such as, for example, a laptop computer or a desktop computer. Multiple clients 102 may connect to the server 102 through a network 104 such as, for example, the Internet. A user on a client 106 may connect to the analytics search engine 202 with the web browser 204.

The analytics search engine 202 may be configured to create and/or filter search results based on one or more standardization constructs, which may be based on a query selected from the list above. FIG. 3 is block diagram depicting an exemplary view of an analytics search engine 202 according to an aspect. The analytics search engine 202 may provide search results responsive to a selected query type. In one aspect, the analytics search engine 202 may filter search results received from another search engine based on one or more standardization constructs. In another aspect, the analytics search engine 202 may generate search results from a user-defined query type based on one or more standardization constructs. The analytics search engine 202 may comprise one or more of, a crawler module 302, a search module 304, a standardization module 306, a natural language processing (NLP) module 308, an ontology module 310, and a search engine index 312. Crawler module 302 may retrieve and analyze electronic documents to determine how to index the electronic documents (e.g., batches of information/data related to an organization). Data about the electronic documents may be stored in analytics search engine 312 for use in queries by search module 304. The standardization module 306 may generate one or more standardization constructs based off of user input, automatic data gathering, combinations thereof, and the like. The standardization module 306 may filter search results returned by the search module 304 and/or may operate in conjunction with the search module 304 to modify the manner in which the search module 304 obtains search results.

The search module 304 may be configured to perform one or more types of searches. In an aspect, the search module 304 may be configured to perform a keyword search and/or a semantic search. A keyword search is a type of search that looks for matching documents (e.g., electronic files) that contain one or more words specified by a user. A semantic search seeks to improve search accuracy by understanding searcher intent and the contextual meaning of terms as they appear in the searchable dataspace, whether on the Web or within a closed system, to generate more relevant results. In an aspect, a semantic search technique may be used to build a semantic model from a set of documents (e.g., webpages, emails, or documents on a file system, for example), and given a search query, find the set of documents that best relate to that query. For example, an inverted index of all words in a document across all documents may be built, and then using various relevancy metrics, the words of the search query (e.g., assumed to be another kind of document) may be compared against the index, and a ranked set of files may be identified that are "closest" to the query. In practice, this serves to simulate semantic search because words that represent a semantic concept tend to cluster together in co-occurrences. The search module 304 may interact with one or more of the NLP module 308 and/or the ontology module 310 to effect a semantic search. For example, the search module 304 may parse a query and use the NLP module 308 and/or the ontology module 310 to develop a list of other related terms, concepts, and/or contexts that may correlate to information desired by a user. The search module 304 may thus generate related terms and/or concepts that relate to a query type using, for example, an ontology. The related terms and/or concepts may be used to expand the query to identify documents that are relevant to the query.

Figure 4:
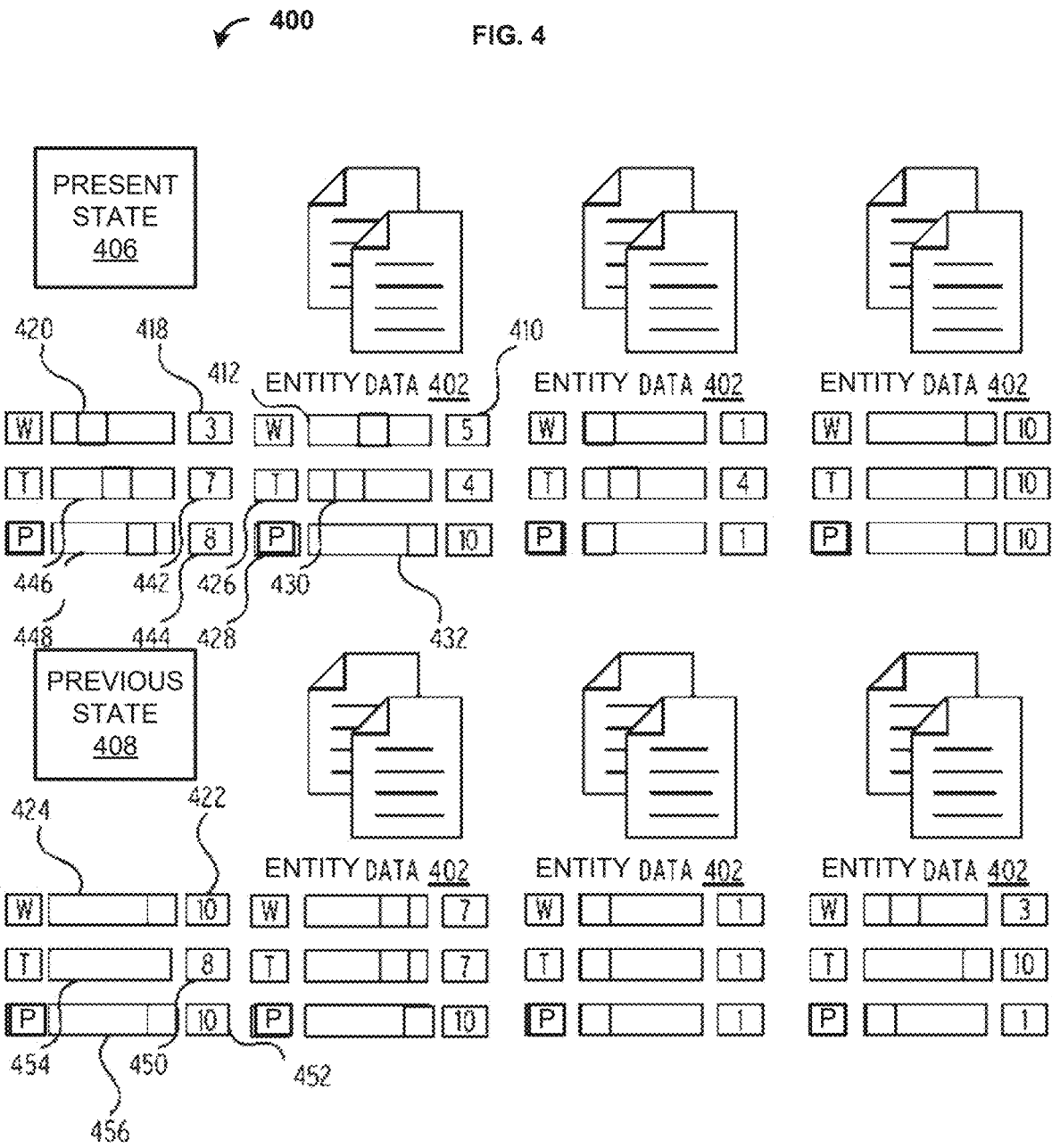
FIG. 4 shows a block diagram of example entity data.

The standardization module 306 may generate a standardization construct manually and/or automatically. Moreover, the standardization module 306 may update a standardization construct manually and/or automatically. The standardization module 306 may be configured to present a user with a user interface to guide a user through the process of providing information used to generate a standardization construct. FIG. 4 is a graphical depiction of an example standardization construct 400. The standardization construct 400 may comprise entity data 402 (e.g., based on batched information related to an organization) in one or more domains (e.g., topics, categories, etc.). For example, the standardization construct 400 may comprise one or more of an efficiency domain, an automation domain, a cost sourcing domain, an organization entity domain, combinations thereof, and the like. In an aspect, the standardization construct 400 may comprise information related to an organization, or an entity thereof, at a present state 406 (e.g., for the past 12 months). In another aspect, the standardization construct 400 may comprise information related to a user at a previous state 408 (e.g., for a 12 month period ending 12 months prior to a current date).

The information related to the organization, or an entity thereof, may be within the one or more domains. In an example, the entity data 402 may have one or more weights 410 given to the entity data 402 (e.g., those data that best define how the organization, or an entity thereof, is performing a given time (e.g., present state 406) and/or how the organization compares against itself (e.g., present state 406 vs. previous state 408). The one or more weights 410 may be interactively adjusted by moving a slider 412. Alternatively, the one or more weights 410 may be system-defined in advance. The one or more domains may comprise a weight 418 that comprises a value indicative of an importance of the domain which may be adjusted by a slider 420 or may be system-defined in advance. The present state 406 may comprise a weight 418 that comprises a value indicative of an importance of the present state 406 that may be interactively adjusted by moving a slider 420 or it may be system-defined in advance. The previous state 408 may comprise a weight 422 that comprises a value indicative of an importance of the previous state 408 (e.g., as compared to the present state 406) that may be interactively adjusted by moving a slider 424 or it may be system-defined in advance. In an aspect, the standardization construct 400 may comprise only the present state 406 or only the previous state 408.

The entity data 402 may also have a time component 426 and/or a peer component 428 associated with the entity data 402. The time component 426 and/or the peer component 428 may be adjusted by moving a slider 430 and a slider 432, respectively, or they may be system-defined in advance. The time component 426 may comprise a value indicative of an amount of time associated with the data. For example, a user may conduct a search query for information within a domain and/or the domain itself associated with a particular time frame (e.g., 1 day, 1 month, 1 year, 10 years, etc.). The peer component 428 may indicate a level of relative achievement of an entity associated with the data as compared to one or more peer entities. The one or more domains may also have a time component 442 and/or a peer component 444 associated with the one or more domains. The time component 442 and/or the peer component 444 may be adjusted by moving a slider 446 and a slider 448, respectively or they may be system-defined in advance. The present state 406 may also have a time component 442 and/or a peer component 444 associated with the present state 406. The time component 442 and/or the peer component 444 may be adjusted by moving a slider 446 and a slider 448, respectively, or they may be system-defined in advance. The previous state 408 may also have a time component 450 and/or a peer component 452 associated with the previous state 408. The time component 450 and/or the peer component 452 may be adjusted by moving a slider 454 and a slider 456, respectively, or they may be system-defined in advance.

Returning to FIG. 3, in a further aspect, the standardization module 306 may be configured to update a standardization construct based on new information related to the organization, or an entity thereof, associated with a corresponding standardization construct. For example, if a user conducts a search related to an organization entity for a given timeframe, and batch information is collected subsequently, the standardization module 306 may modify the standardization construct to reflect that the organization entity's standardization rate has changed accordingly.

In another aspect, the standardization module 306 may be configured to automatically generate a standardization construct. The standardization module 306 may retrieve data about an organization, or an entity thereof, from one or more data sources. By way of example, the standardization module 306 may receive batch information for an organization entity (e.g., supply purchase orders, sales, current inventory, etc.) from the one or more data sources. The standardization module 306 may retrieve the batch information from the one or more data sources and automatically classify the corresponding data. For example, the standardization module 306 may pass the corresponding data to one or more of the NLP module 308 and/or the ontology module 310 to analyze and classify the data. The classified data may be assigned to one or more domains. For example, the standardization module 306 may retrieve purchase order records for an organization entity for a particular supply item (e.g., a medication). The standardization module 306, the NLP module 308, and/or the ontology module 310 may determine that the purchase order records are associated with automated orders (e.g., orders automatically placed once a stock of the medication reaches a threshold level). The standardization module 306 may use that data to populate one or more domains to which that type of data is relevant (e.g., an automation domain). The standardization module 306 may use this process to generate a standardization construct and may seek user input as to the accuracy of the standardization construct. The standardization module 306 may continue to monitor the one or more data sources to update/refine the standardization construct.

In an aspect, once the batch information is retrieved (or received) from the one or more data sources, the standardization module 306 may perform a clustering operation on the received batch information and a plurality of other batches of information. The clustering operation may comprise, for example, performing one or more of a hierarchical clustering operation, a k-means operation, and combinations thereof. The result of the clustering operation may be one or more clusters of products/supplies. For example, the batch information may comprise purchase order records for one or more medications. The analytics search engine 202 may determine that one or more of the medications ordered has one or more attributes in common (e.g., an active ingredient, an intended use, a brand, etc.). Each cluster may be made up of products/supplies determined to be most similar to each other based on the content of the received batch information. A description of each cluster may be generated and stored. The description may comprise a summary of the commonality between the products/supplies found in each cluster (e.g., a same type of medication/item, a size, a brand, etc.). The descriptions may be stored in a searchable database to enable users, as well as the standardization module 306, to identify opportunities for the corresponding organization, or entity thereof, to improve one or more standardization rates for one or more domains.

The natural language processing (NLP) module 308 may analyze textual information from search queries, search results, indexed electronic files (e.g., batch information received for an organization), combinations thereof, and the like. Textual information may be input into the NLP module 308, and the NLP module 308 may generate a cognitive model of the input text. In other words, a query in natural language may be parsed into the representation format of first-order logic and naive semantics. A naive semantic system that incorporates modules for text processing based upon parsing, formal semantics and discourse coherence, as well as relying on a naive semantic lexicon that stores word meanings in terms of a hierarchical semantic network is disclosed. The cognitive model may then be passed to the search module 304, that may use a high recall statistical retrieval module (not shown) using unspecified statistical techniques to produce a list of documents and a relevance reasoning module (not shown) which may use first-order theorem proving and human-like reasoning to determine which documents/charts/graphs should be presented to the user. Textual information may be based on sentence structure, for example, based on a word-by-word analysis and/or a whole sentence analysis. In an aspect, the NLP module 308 may determine word frequencies for some or all words contained in textual information. The NLP module 308 may be configured to disambiguate and resolve homograph issues to accurately identify words and their frequencies.

The ontology module 310 which may be configured for performing a concept-based method for searching text information (e.g., contained within received batch information). The ontology module 310 may interact with the NLP module 308 to transform a natural language query into predicate structures representing logical relationships between words in the natural language query. The ontology module 310 may comprise one or more ontologies and/or thesauri containing lexical semantic information about words and may be configured for ranking a set of matching natural language query predicate structures and equivalent textual information predicate structures. The ontology module 310 may provide a logical representation and/or a semantic representation for all of the content in an electronic document. In an aspect, such a logical representation and/or a semantic representation may be referred to herein as a data profile. A thesaurus is a structured controlled vocabulary. The thesaurus provides information about each term and its relationships to other terms within the same thesaurus. In addition to specifying which terms may be used as synonyms (called "used from"), a thesaurus also indicates which terms are more specific (narrower terms), which are broader, and which are related terms. An ontology is set of concepts with attributes and relationships between the various concepts that contain various meanings, all to define a domain of knowledge, and is expressed in a format that is machine-readable. Certain applications of ontologies, as used in artificial intelligence or biomedical informatics, may define a domain of knowledge through terms and relationships. In the area of taxonomies and information science, however, an ontology may be seen as a more complex type of thesaurus, in which instead of having simply "related term" relationships, there are various customized relationship pairs that contain specific meaning, such as "owns" and a reciprocal "is owned by."

The ontology module 310 may generate one or more data profiles, optionally in conjunction with the NLP module 308. A data profile may comprise a list of concepts and/or terms and their associated relevance weights. A weight may indicate an importance of a concept/term with regard to other concepts/terms. The weights may represent, for example, the frequency with which the concepts occur in textual information, the specificity of the concepts, statistical characteristics of each concept, and the like. Statistical characteristics of concepts may include, without limitation, the specificity, the sensitivity, the number of alternatives occurring in the textual information, the textual similarity, and the like.

The ontology module 310 and/or the NLP module 308 may determine a weight for a concept/term in received batch information documents (e.g., purchase order records, shipment records, inventory records, and the like) by calculating a number of occurrences (e.g., a frequency) of all concepts/terms (e.g., medication name, item type, size, intended use, etc.). For example, if Product A (e.g., "gloves") occurs ten times in a document and Product B (e.g., "scrubs") occurs five times in the document, the frequency of Product A may be "normalized" to 100% ((10/10)*100%) and Product B may be "normalized" to 50% ((5/10)*100%). The following equation may be used for normalization: (frequency/max_frequency)*100%. A correction algorithm may reduce the weight of concepts/products that occur in many documents. For example, if a purchase order record is indexed, a very generic term like "sterile" will not be very informative while a term like "acetaminophen" is very specific. Therefore, if the frequency of the term "sterile" in a document is higher than the frequency of the term "acetaminophen," then the term "acetaminophen" would have higher weight after correction.

In an aspect, the ontology module 310 and/or the NLP module 308 may generate a data profile based on a search query and/or a standardization construct. The resulting data profile may be used to identify one or more search results based on a comparison between a query data profile and data profiles of potential search results. For example, an amount of overlap between the query data profile and the data profiles of potential search results may identify relevant search results. Determining an overlap of data profiles among a plurality of data profiles may comprise determining a number of terms that data profiles have in common. In another aspect, a similarity score may be generated that reflects a similarity between a query data profile and the data profiles of potential search results. Determining a similarity score amongst a plurality of data profiles may comprise performing a matching algorithm. Performing a matching algorithm may comprise storing each data profile as a vector and performing a vector matching algorithm. In one exemplary aspect, a data profile may be stored mathematically as a vector with values between 0 and 1. In this aspect, the matching of a query data profile with a stored data profile may be accomplished via vector matching. As one skilled in the art will appreciate, a variety of algorithms known in the art may be used to calculate the distance between the vectors. In a further aspect, the various algorithms for determining the distance between vectors may comprise, but are not limited to, Vector algorithm, Portal algorithm, Quad-sum algorithm, Jaccard algorithm, Dice algorithm, Basic algorithm, Weighted algorithm, Orion algorithm, Weighted Overlap algorithm, and the like. It is contemplated that one or more of these algorithms may be used concurrently.

The analytics search engine 312 may be a database listing comprising, for example, electronic documents, electronic document metadata, and the like, referred to herein as search results. The analytics search engine 312 may be configured to maintain a listing of data profiles and/or standardization constructs. Searching the analytics search engine 312 may utilize metadata. For example, the analytics search engine 312 by metadata may comprise performing a Boolean search. Searching the analytics search engine 312 by metadata may comprise performing a search by determining a deviation of a metadata value from a specified value and expressing the deviation in a relevance score. Searching the analytics search engine 312 by vector matching may comprise storing each data profile as a vector and performing a vector matching algorithm. Searching the analytics search engine 312 by metadata and by vector matching may be performed simultaneously. Searching the analytics search engine 312 by metadata and by vector matching may be performed sequentially.

Figure 5:
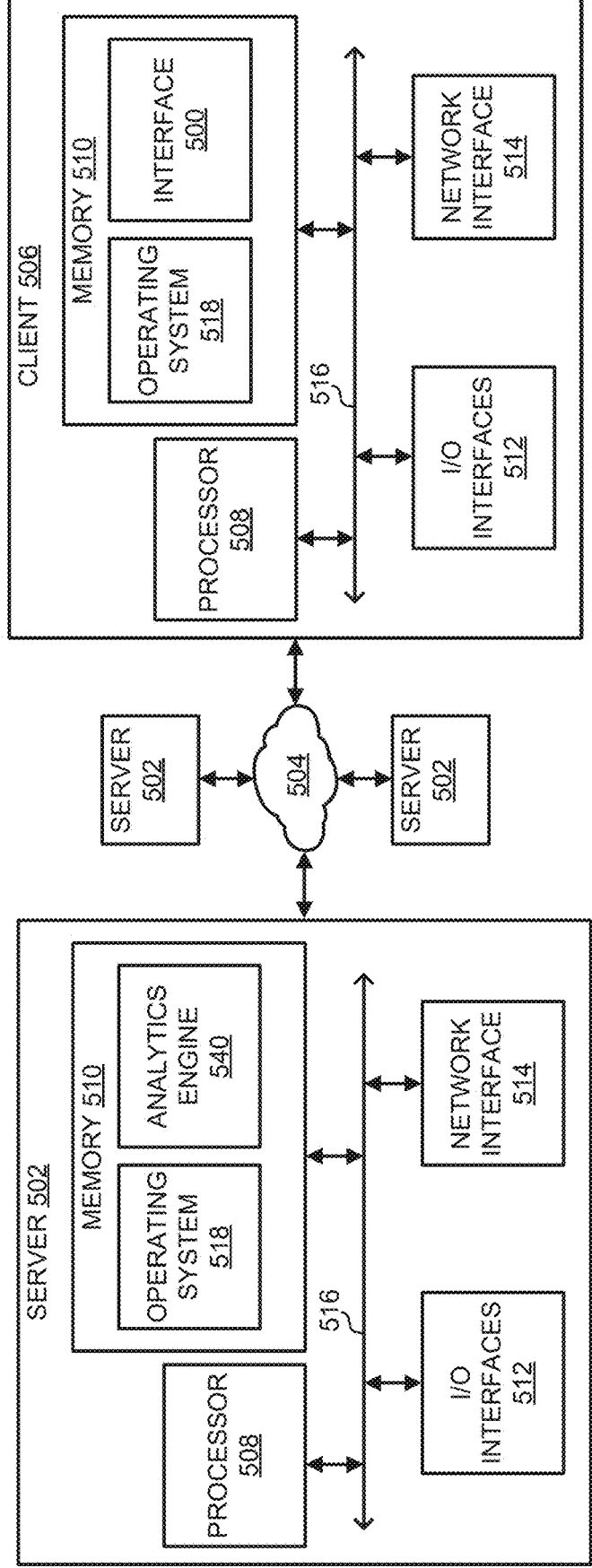
FIG. 5 shows a block diagram of an example client/server environment.

FIG. 5 is a block diagram depicting an environment 500 comprising non-limiting examples of a server 502 and a client 506 connected through a network 504. The server 502 may comprise one or multiple computers configured to store one or more of the analytics search engine 202, the entity data 402, or the like. The client 506 may comprise one or multiple computers configured to operate the user interface 500 (e.g., via a web browser) such as, for example, a laptop computer or a desktop computer. Multiple clients 506 may connect to the server(s) 502 through a network 504 such as, for example, the Internet. A user on a client 506 may connect to the analytics search engine 202 with a user interface 530.

The server 502 and the client 506 may be a digital computer that, in terms of hardware architecture, generally includes a processor 508, memory system 510 (e.g., the memory 310), input/output (I/O) interfaces 512, and network interfaces 514. These components (508, 510, 512, and 514) are communicatively coupled via a local interface 516. The local interface 516 may be, for example but not limited to, one or more buses or other wired or wireless connections, as is known in the art. The local interface 516 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 508 may be a hardware device for executing software, particularly that stored in memory system 510. The processor 508 may be any custom made or commercially available processor, a central processing unit (CPU), an auxiliary processor among several processors associated with the server 502 and the client 506, a semiconductor-based microprocessor (in the form of a microchip or chip set), or generally any device for executing software instructions. When the server 502 or the client 506 is in operation, the processor 508 may be configured to execute software stored within the memory system 510, to communicate data to and from the memory system 510, and to generally control operations of the server 502 and the client 506 pursuant to the software.

The I/O interfaces 512 may be used to receive user input from and/or for providing system output to one or more devices or components. User input may be provided via, for example, a keyboard and/or a mouse. System output may be provided via a display device and a printer (not shown). I/O interfaces 512 may include, for example, a serial port, a parallel port, a Small Computer System Interface (SCSI), an IR interface, an RF interface, and/or a universal serial bus (USB) interface.

The network interface 514 may be used to transmit and receive from an external server 502 or a client 506 on a network 504. The network interface 514 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interface 514 may include address, control, and/or data connections to enable appropriate communications on the network 504.

The memory system 510 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 510 may incorporate electronic, magnetic, optical, and/or other types of storage media. Note that the memory system 510 may have a distributed architecture, where various components are situated remote from one another, but may be accessed by the processor 508.

The software in memory system 510 may include one or more software programs, each of which comprises an ordered listing of executable instructions for implementing logical functions. In the example of FIG. 5, the software in the memory system 510 of the server 502 may comprise an analytics engine 540 (e.g., analytics search engine 202) and a suitable operating system (O/S) 518. In the example of FIG. 5, the software in the memory system 510 of the client 506 may comprise the user interface 500 and a suitable operating system (O/S) 518. The operating system 518 essentially controls the execution of other computer programs, such as the operating system 518, the user interface 500, and provides scheduling, input-output control, file and data management, memory management, and communication control and related services.

The analytics search engine 202 may be used for providing search results responsive to a query type selected by a user. In an aspect, the query type may be one or more of the query types listed above, keywords, a phrase, a question, a natural language query, a concept, combinations thereof, and the like. A search result may comprise a web site or any other electronic file. The present description will refer to web sites for simplicity. A web site may reside on a network 104 (e.g., Internet) and may be a collection of one or more web pages, which are electronic documents that may be coded, for example, in HTML that are linked to each other and very often to pages on other web sites. A web site may be hosted on a website owner's server or on an ISP's (Internet Service Providers) server. A web site may share space on a server with other web sites, reside on a server 102 dedicated to that web site only, or be on multiple dedicated servers 102. A web page may contain a variety of information. Additionally, a web page may provide commercial transactions to users. The analytics search engine 202 may be configured to search for relevant data to be used to generate graphical representations of one or more standardization constructs (e.g., text, charts, graphs, etc.). The analytics search engine 202 may comprise one or databases. The analytics search engine 202 may use one or more algorithms to store and retrieve relevant search results in the database(s) responsive to the query type. The analytics search engine 202 may comprise an updating algorithm to regularly search for new or updated standardization constructs. The analytics search engine 202 may be configured to operate on one or multiple server(s) 102.

The analytics search engine 202 may be configured to determine one or more of a domain-level link feature, a page-level link feature, a page-level keyword feature, a page-level content-based feature, a page-level keyword-agnostic feature, engagement data, traffic/query data, domain-level brand metrics, domain-level keyword usage, domain-level keyword-agnostic feature, page-level social metrics, and combinations thereof. The analytics search engine 202 may utilize such features to determine a relevance of a potential search result (e.g., a standardization construct). The analytics search engine 202 may be configured to determine a similarity between a data profile of a standardization construct (e.g., for a first organization and/or entity thereof) to a data profile of one or more other data profiles for one or more other standardization constructs (e.g., for another organization and/or entity thereof).

A web browser 204 may be used to view web pages on a client 106. The web pages may reside on a network 104 (e.g., Internet) or on a local computer. A web browser 204 may be configured to view a web page responsive to an input from a user. The input may be a URL (Uniform Resource Locator) address input directly into the web browser or a hyperlink on a currently viewed web page. Examples of commonly used web browsers include Google Chrome, Microsoft Internet Explorer, Netscape Navigator, and Mozilla Firefox.

The analytics search engine 202 and/or the web browser 204 may be a source program, an executable program (object code), a script, or any other entity comprising a set of instructions to be performed. When the analytics search engine 202 and/or the web browser 204 is a source program, then the analytics search engine 202 and/or the web browser 204 may be translated via a compiler, assembler, interpreter, or the like, which may or may not be included within the memory system 504, so as to operate properly in connection with the O/S 506. Furthermore, the analytics search engine 202 and/or the web browser 204 may be written as (a) an object oriented programming language, which has classes of data and methods, or (b) a procedure programming language, which has routines, subroutines, and/or functions, such as, for example, but not limited to, C, C++, Pascal, Basic, Fortran, Cobol, Perl, and Java.

When the analytics search engine 202 and/or the web browser 204 is implemented in software, it should be noted that the analytics search engine 202 and/or the web browser 204 may be stored on any computer readable medium for use by or in connection with any computer related system or method. In the context of this document, a computer readable medium is an electronic, magnetic, optical, or other physical device or means that may contain or store a computer program for use by or in connection with a computer related system or method. The analytics search engine 202 and/or the web browser 204 may be embodied in any computer-readable medium for use by or in connection with an instruction execution system, apparatus, or device, such as a computer-based system, processor-containing system, or other system that may fetch the instructions from the instruction execution system, apparatus, or device and execute the instructions. In the context of this document, a "computer-readable medium" may be any non-transitory means that may store, communicate, propagate, or transport the program for use by or in connection with the instruction execution system, apparatus, or device. The computer readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 6:
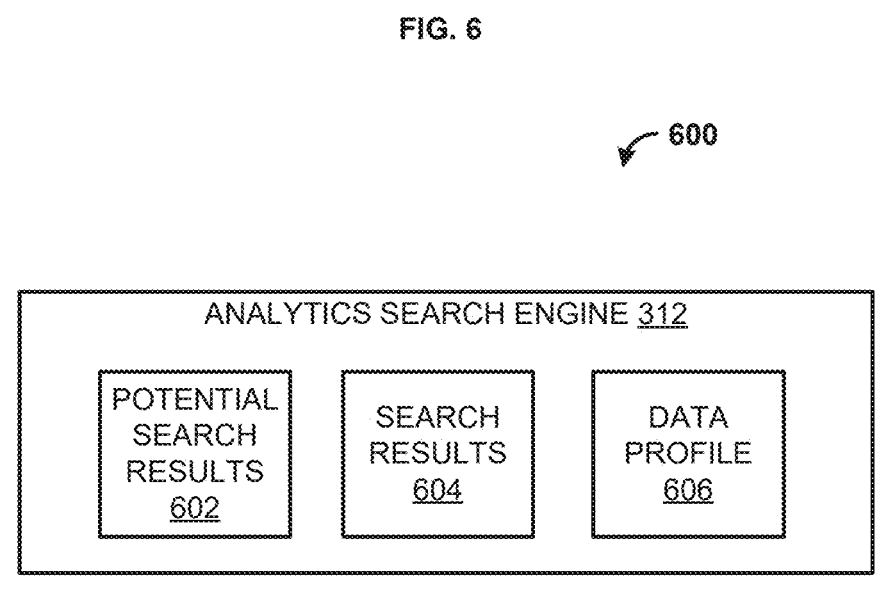

FIG. 6 is block diagram depicting an exemplary view of an analytics search engine 312. The analytics search engine 312 may comprise potential search results 602, search results 604, and/or data profiles 606. The potential search results 602 may comprise search results that are generated based on a search query. In another aspect, the potential search results 602 may comprise all or a portion of a universe of possible search results that have been indexed prior to a search query. In an aspect, the potential search results 602 may comprise one or more tags that provide information regarding the content of the potential search results 602 that may be used by the analytics search engine 202 to determine whether the potential search results 602 are responsive to a search query in light of a standardization construct. The one or more tags may be generated manually (e.g., by selection by a user) or automatically. The one or more tags may be generated automatically (for example, by the NLP module 308 and/or the ontology module 310) by computationally determining one or more terms and/or concepts that define the content of the potential search results 602. In another aspect, the one or more tags may be generated based on a data profile created by one or more of the NLP module 308 and/or the ontology module 310, as described herein. In one aspect, the one or more tags may be stored as metadata associated with the potential search results 602.

Figure 7:
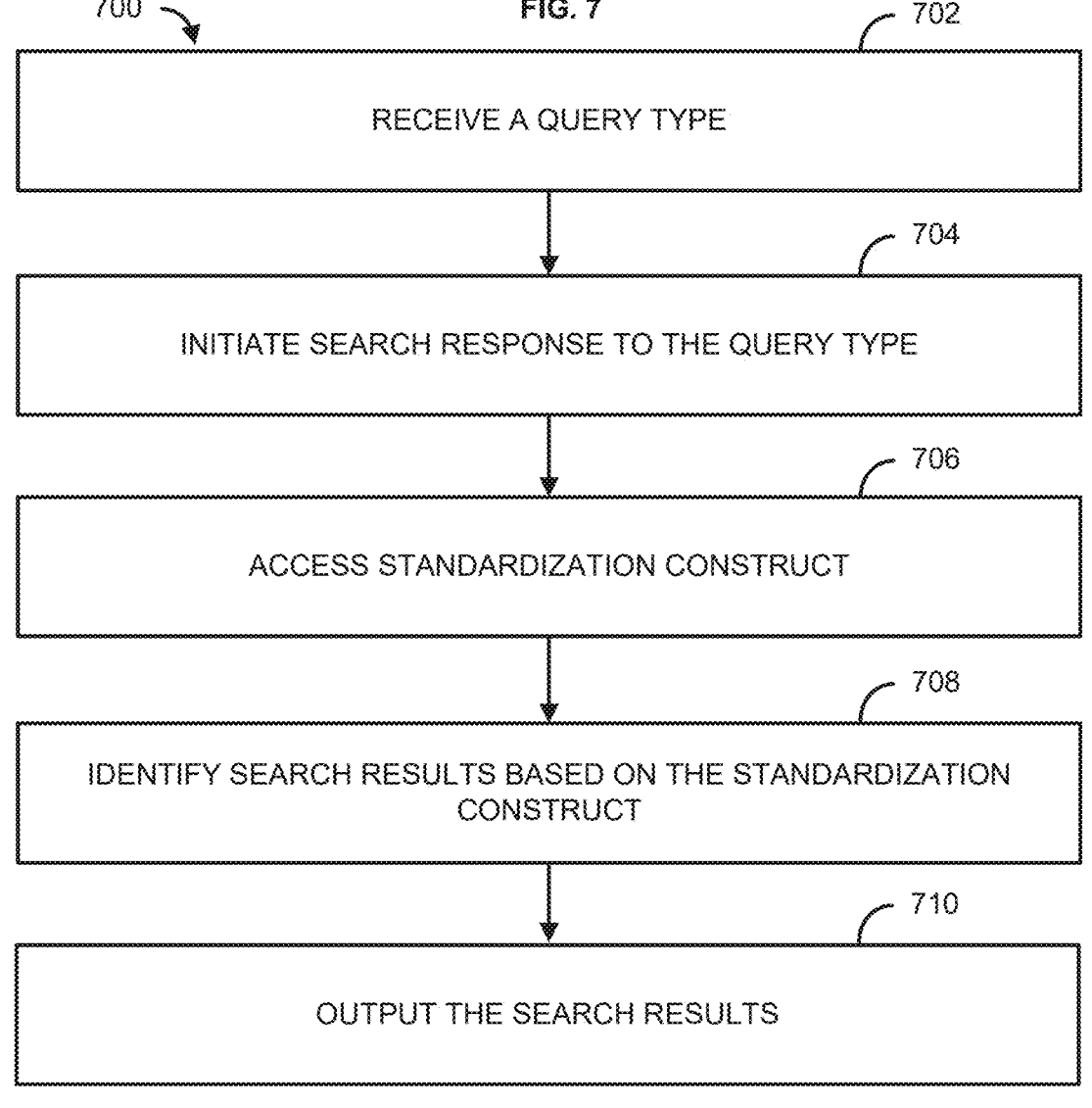
FIG. 7 shows a flowchart of an example method.

FIG. 7 is a flowchart depicting a general example of a method 700 for providing search results using an analytics search engine. A query type is received from a user, as indicated in step 702. For example, a web browser, or similar may be configured to view an analytics search engine web page, and a user may input a query type to the search engine via the web browser. A search is initiated responsive to the query type, as indicated in step 704. For example, a search engine may initiate a search of a database responsive to the query type. A standardization construct may be accessed, as indicated in step 706. Search results are identified based on the standardization construct, as indicated in step 708. The search results are outputted to an output device, as indicated in step 710.

Figure 8:
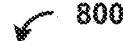
FIG. 8 shows an example user interface.

FIG. 8 is a schematic diagram depicting an example of user interface screen 800 showing search results generated based on a standardization construct. The user interface screen 800 may comprise a query category box 802, a select button 804, a present state header 806, a previous state header 808, present results 810, previous results 812, and a page indicator 814. A user inputs a query type in the query category box 802 and initiates a search by clicking on the select button 804. An analytics search engine may provide the present results 810 and the previous results 812 in separate, adjacent columns. In an aspect, the analytics search engine may be configured to only deliver the present results 810 or the previous results 812. The present state header 806 and the previous state header 808 provide the user with the number of results found by the search engine. The present results 810 and the previous results 812 comprise web page links which the user may click on to visit the web page. The page indicator 814 provides the user with the current page of search results and a link to go to the next or the previous page of search results.

Figure 9:
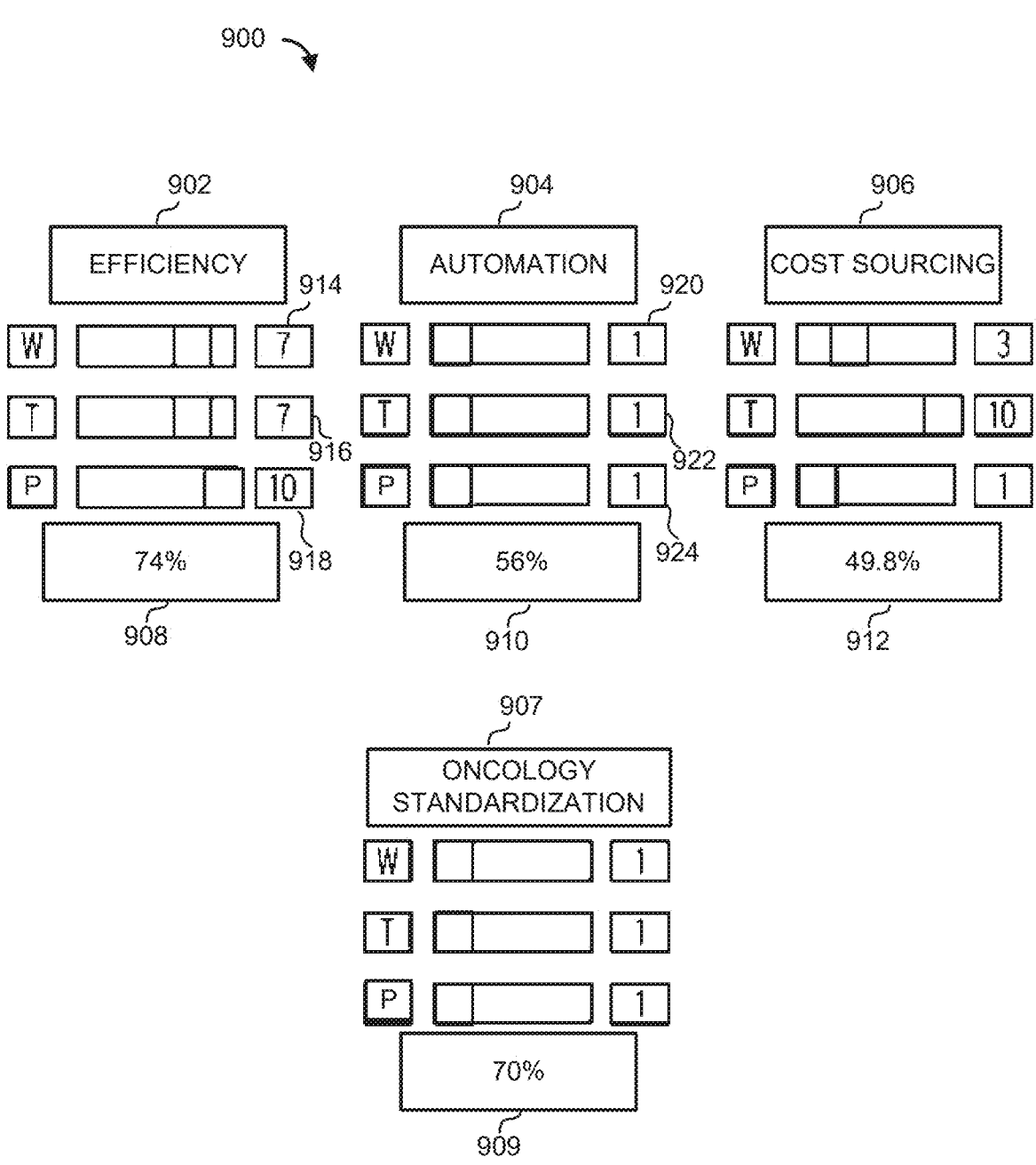
FIG. 9 shows a block diagram of example standardization data.

An example standardization construct 900 is illustrated as a block diagram in FIG. 9, which may be used to indicate how the analytics search engine 202 generates the present results 810 and the previous results 812. The standardization construct 900 may comprise four domains: an efficiency domain 902, an automation domain 904, a cost sourcing domain 906, and an organization entity domain 907. The efficiency domain 902 may comprise organization data related to purchase intervals, shipping intervals, purchases source(s), etc. The efficiency domain 902 in the standardization construct 900 comprises a standardization rate 908 with a value of 74%. As the standardization construct 900 reflects a current performance of an organization, the value of 74% represents performance for a current time period (e.g., last 12 months). The automation domain 904 may comprise organization data related to online/automated purchases/ordering, etc. The automation domain 904 in the standardization construct 900 comprises a standardization rate 910 with a value of 56%. The cost sourcing domain 906 may comprise organization data related to purchase source (s), etc. The cost sourcing domain 906 in the standardization construct 900 comprises a standardization rate 912 with a value of 49.8%. The organization entity domain 907 may comprise a name of a practice group, specialty group, or other department of a medical services provider, etc. The organization entity domain 907 in the standardization construct 900 is for an oncology group entity and comprises a standardization rate 909 with a value of 90%. The standardization rate 909 may be based on a hybrid value of one or more standardization rates for the particular organization entity—in this case oncology—for one or more domains associated with that organization entity (e.g., standardization rate 908, standardization rate 910, standardization rate 912).

The standardization construct 900 may comprise a weight assigned to each of the domains (e.g., standardization rate 908, standardization rate 910, standardization rate 912). The weight assigned to each domain reflects how much that domain should be taken into account when generating an overall standardization rate for an organization entity (e.g., standardization rate 909 for the oncology department). The standardization construct 900 may comprise a time component for the organization data that comprises a value indicative of an amount of time associated with the data. The standardization construct 900 may comprise a peer component for the organization data that comprises a value indicative of a level of relative performance of an organization entity in a particular domain as compared to one or more peer entities. In the standardization construct 900, the domain 902 for efficiency is assigned a value 914 of "7", a time component 916 of "7", and a peer component 918 of "10". Accordingly, the domain 902 for efficiency is afforded significant weight.

Figure 10:
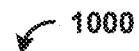
FIG. 10 shows an example user interface.

FIG. 10 illustrates a user interface screen 1000 with a non-limiting example of a selection of a query type of "Care Setting by Specialty" in a selection box 1002. A search results header 1004 is affixed above search results 1006. The user interface screen 1000 illustrates an example of search results based on the standardization construct 900 provided in FIG. 9. For example, the search results 1006 for "Care Setting by Specialty" may comprise a graphical depiction of standardization rates and other data related to an organization. In an aspect, the standardization construct 900 may be modified after the search has been conducted to modify the search results 1006. For example, the time component 916 of "7" for the domain 908 could be modified post-search to a "10." The result would be to identify potential standardization rates for an entity (e.g., based on changes that affect the particular domain). Any aspect of a standardization construct may be modified post-search to allow a user to adjust the search results and fine tune the search results to the user's liking. For example, a user may add/delete a domain, add/delete organization data contained within a domain, modify a weight of a domain and/or organization data, modify a time component of a domain and/or organization data, modify a peer component of a domain and/or organization data, combinations thereof, and the like.

Figure 11:
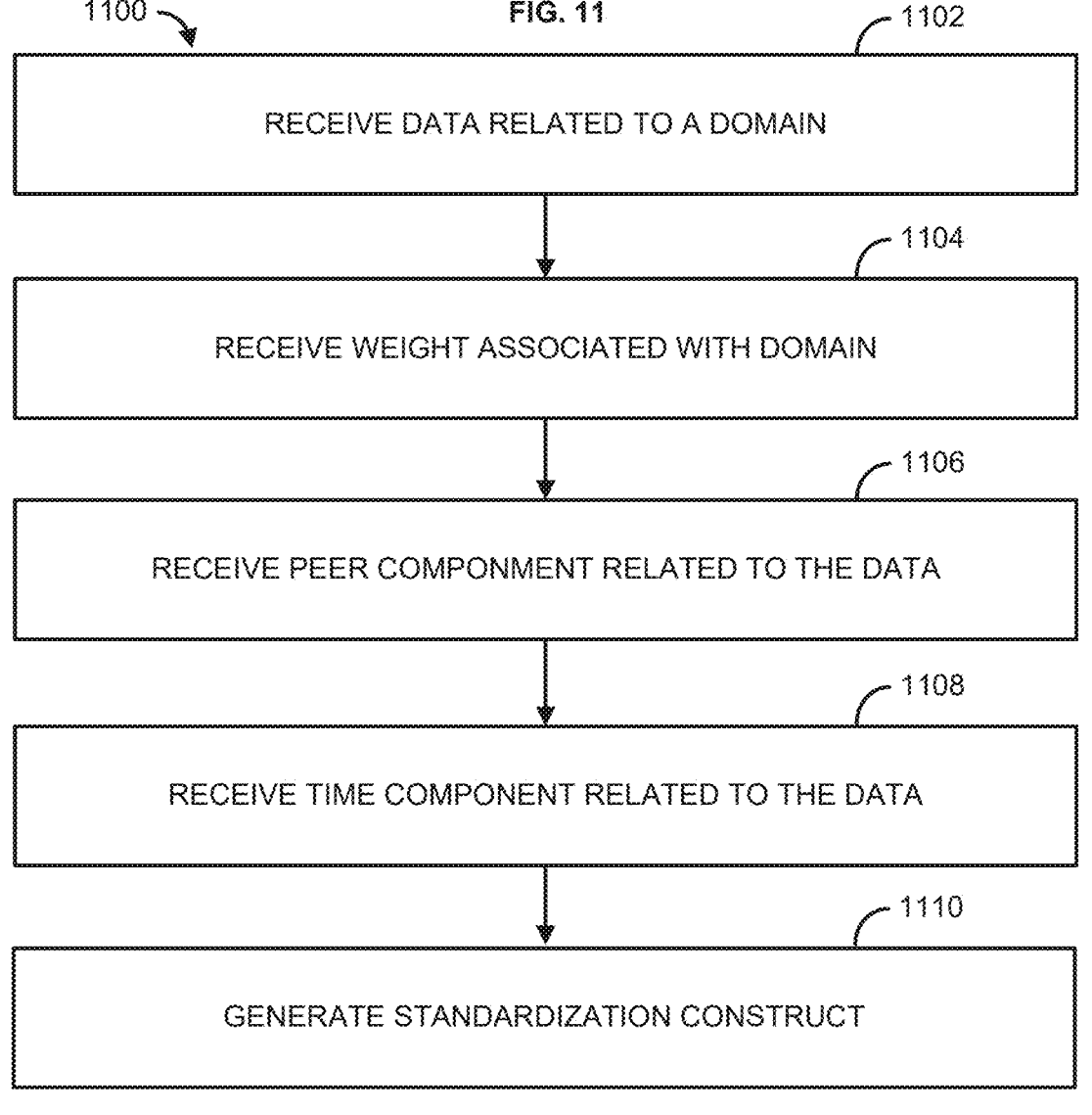
FIG. 11 shows a flowchart of an example method.

In an aspect, illustrated in FIG. 11, provided is a method 1100 comprising, in step 1102, method 1100 receives data related to a domain of a plurality of domains. In step 1104, method 1100 receives a weight associated with a domain. In step 1106, method 1100 receives a peer component related to the data. In step 1108, method 1100 receives a time component related to the data. In step 1110, method 1100 generates a standardization construct based on the data, the domain, the weight, the peer component, and the time component. In some embodiments, the data may include information related to an organization, or an entity thereof, at a present state. In some embodiments, the data may include information related to an organization, or an entity thereof, at a previous state. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

Figure 12:
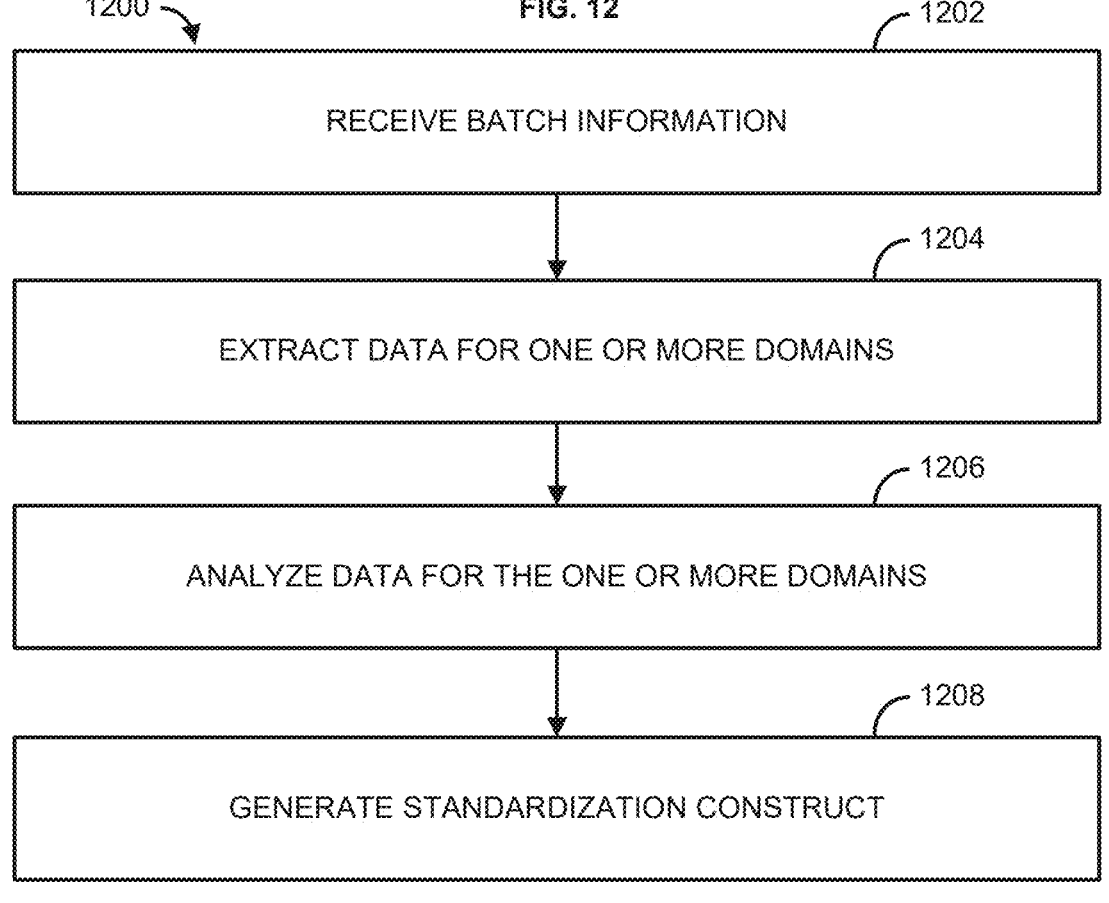
FIG. 12 shows a flowchart of an example method.

In an aspect, illustrated in FIG. 12, provided is a method 1200 comprising in step 1202, method 1200 receives batch information for an organization entity. In step 1204, method 1200 extracts data for one or more domains from the batch information. In step 1206, method 1200 analyzes data for the one or more domains. In step 1208, method 1200 generates a standardization construct based on the analyzed data for the one or more domains. In some embodiments, analyzing data for the one or more domains may include classifying received batch information data into a plurality of domains and/or assigning a weight to each of the plurality of domains. In some embodiments, such a method may further include receiving a peer component related to the data and/or receiving a time component related to the data.

In some embodiments, the data may include information related to an organization at a present state. In some embodiments, the data may include information related to an organization at a previous state. In some embodiments, the received batch information may include information related to an organization, or an entity thereof, at a present state. In some embodiments, the received batch information may include information related to an organization, or an entity thereof, at a previous state. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

Figure 13:
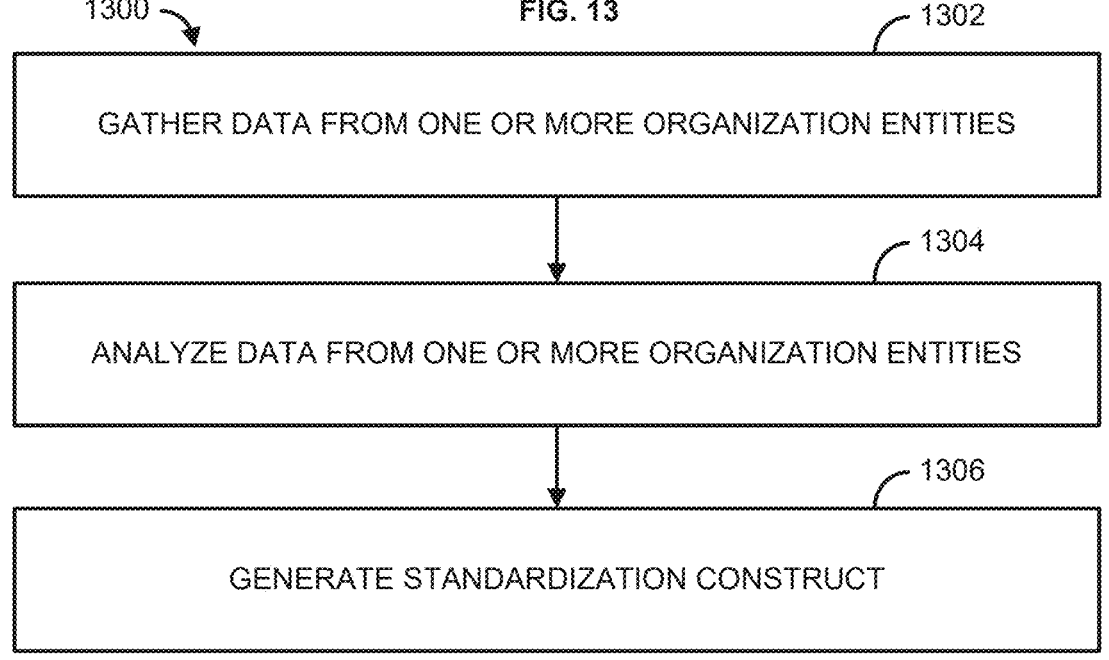
FIG. 13 shows a flowchart of an example method.

In an aspect, illustrated in FIG. 13, provided is a method 1300 comprising in step 1302, method 1300 gathers data from one or more organizations, or one or more entities thereof. In step 1304, method 1300 analyzes the data from the one or more organizations, or the one or more entities thereof. In step 1306, method 1300 generates a standardization construct. In some embodiments, the data may include information related to an organization or entity at a present state. In some embodiments, the data may include information related to an organization at a previous state. In some embodiments, the one or more organizations, or the one or more entities thereof, may include one or more of, a practice group, specialty group, or other department of a medical services provider. In some embodiments, the standardization construct may include a data structure configured for filtering one or more search results and/or one or more search queries.

In some embodiments, analyzing the data may include classifying the data into a plurality of domains and/or assigning a weight to each of the plurality of domains. In some embodiments, the weight may include a value indicative of an importance of the domain. In some embodiments, the plurality of domains may include an efficiency domain, an automation domain, a cost sourcing domain, or an organization entity domain. In some embodiments, such a method may further include receiving a peer component related to the data and/or receiving a time component related to the data. In some embodiments, the time component may include a value indicative of an amount of time associated with the data. In some embodiments, the peer component may include a value indicative of a level of relative achievement of an entity associated with the data as compared to one or more peer entities.

Figure 14:
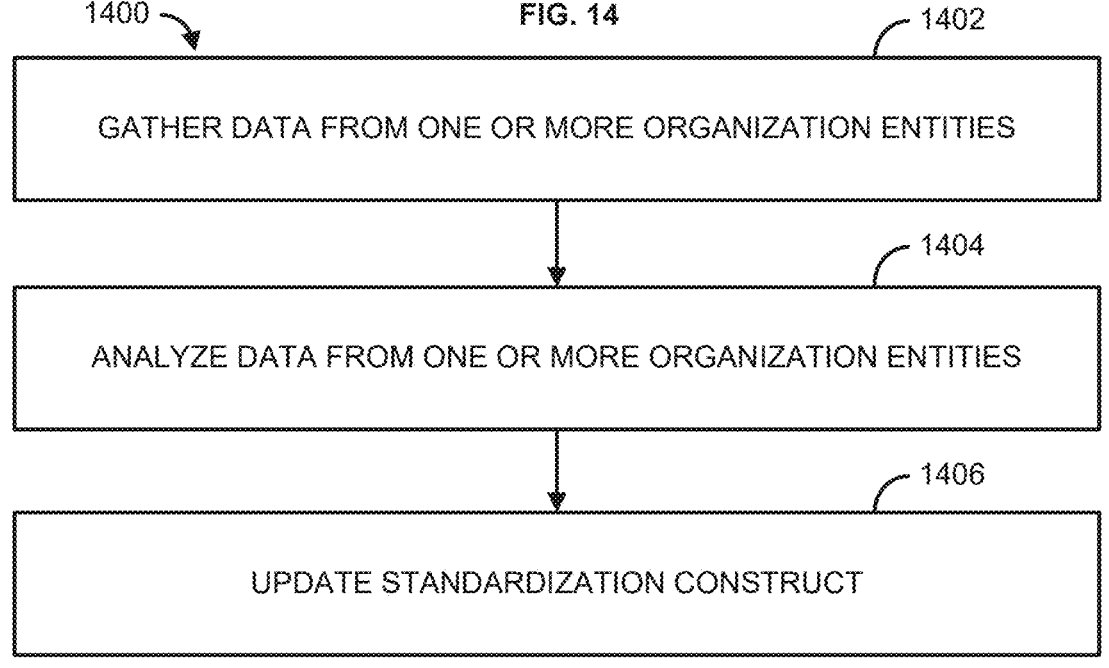
FIG. 14 shows a flowchart of an example method.

In an aspect, illustrated in FIG. 14, provided is a method 1400 comprising in step 1402, method 1400 gathers data from one or more organizations, or one or more entities thereof. In step 1404, method 1400 analyzes the data from the one or more organizations, or the one or more entities thereof. In step 1406, method 1400 updates a standardization construct (e.g., based on a previously generated standardization construct and batch information subsequently received for the one or more organizations, or the one or more entities thereof). In some embodiments, the data may include information related to an organization or entity at a current state (e.g., the data may include data for a time period occurring after the time period associated with a previously generated standardization construct). In some embodiments, the one or more organizations, or the one or more entities thereof, may include one or more of, a practice group, specialty group, or other department of a medical services provider. In some embodiments, the updated standardization construct may include a data structure configured for filtering one or more search results and/or one or more search queries.

In some embodiments, analyzing the data may include classifying the data into a plurality of domains and/or assigning a weight to each of the plurality of domains. In some embodiments, the weight may include a value indicative of an importance of the domain. In some embodiments, the plurality of domains may include an efficiency domain, an automation domain, a cost sourcing domain, or an organization entity domain. In some embodiments, such a method may further include receiving a peer component related to the data and/or receiving a time component related to the data. In some embodiments, the time component may include a value indicative of an amount of time associated with the data. In some embodiments, the peer component may include a value indicative of a level of relative achievement of an entity associated with the data as compared to one or more peer entities.

Figure 15:
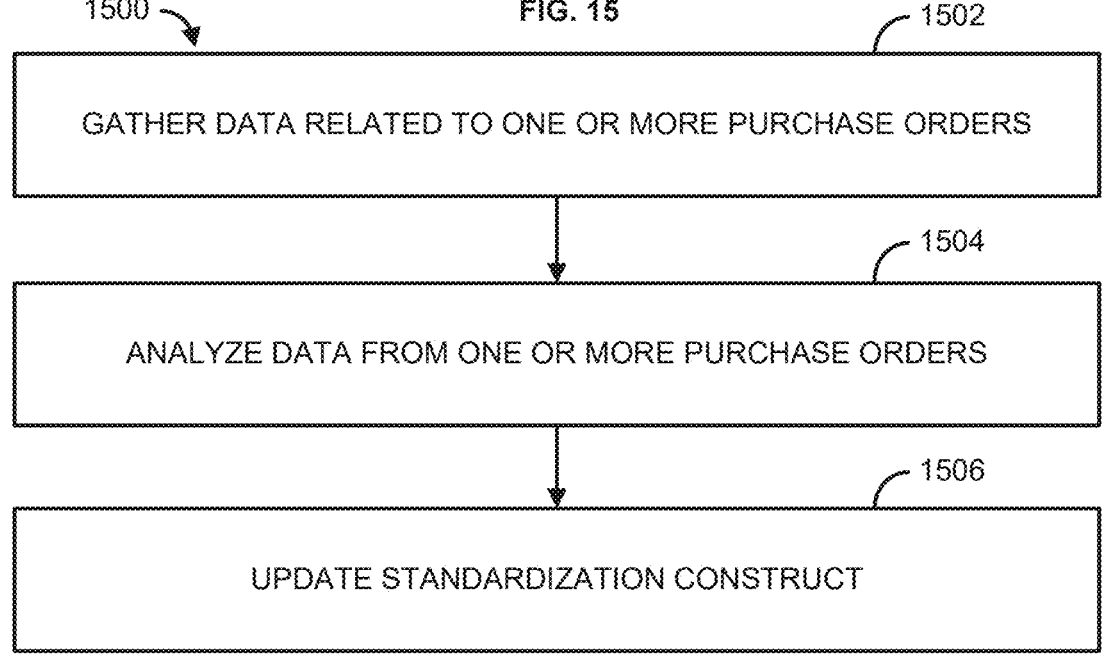
FIG. 15 shows a flowchart of an example method.

In an aspect, illustrated in FIG. 15, provided is a method 1500 comprising in step 1502, method 1500 gathers data related to one or more purchase orders for one or more organizations, or one or more entities thereof. In step 1504, method 1500 analyzes the data from the one or more purchase orders (e.g., using the clustering procedure described above). In step 1506, method 1500 updates a standardization construct.

Figure 16:
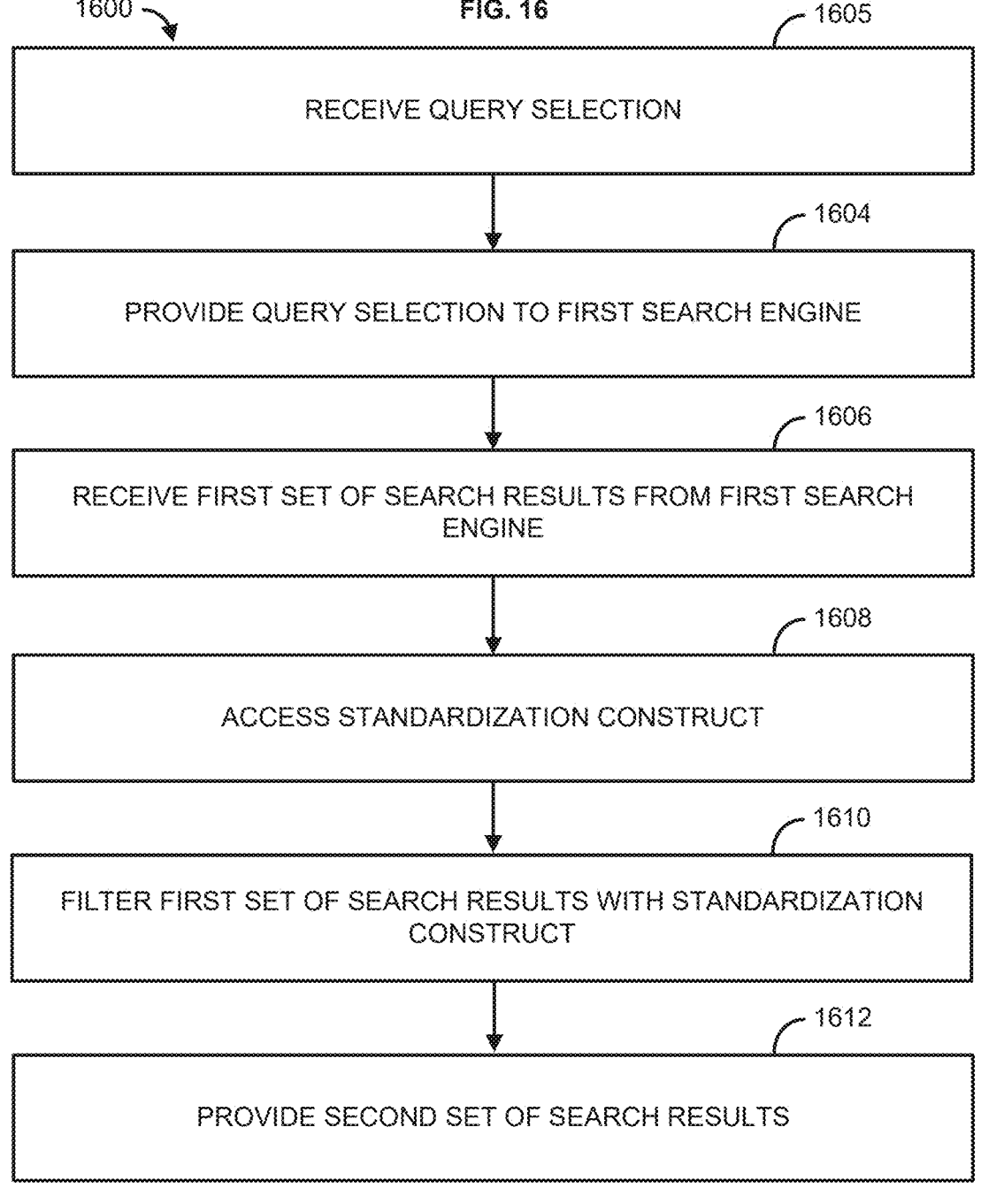
FIG. 16 shows a flowchart of an example method.

In an aspect, illustrated in FIG. 16, provided is a method 1600 comprising in step 1602, method 1600 receives a query selection (e.g., one of the query types described above). In step 1604, method 1600 provides the search query to a first search engine. In step 1606, method 1600 receives a first set of search results from the first search engine. In step 1608, method 1600 accesses a standardization construct. In step 1610, method 1600 filters the first set of search results with the standardization construct to generate a second set of search results. In step 1612, method 1600 provides the second set of search results In some embodiments, a method may include receiving a query selection, providing the query selection to a first search engine, receiving a first set of search results from the first search engine, accessing a standardization construct, filtering the first set of search results with the standardization construct to generate a second set of search results, and/or providing the second set of search results. In some embodiments, receiving the query selection may include receiving one or more keywords. In some embodiments, providing the query selection to the first search engine may include passing the query selection to the first search engine via a hypertext transfer protocol. In some embodiments, receiving the first set of search results from the first search engine may include receiving the first set of search results via a hypertext transfer protocol. In some embodiments, the standardization construct may include a data structure configured for filtering the first set of search results.

In some embodiments, the standardization construct may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

Figure 17:
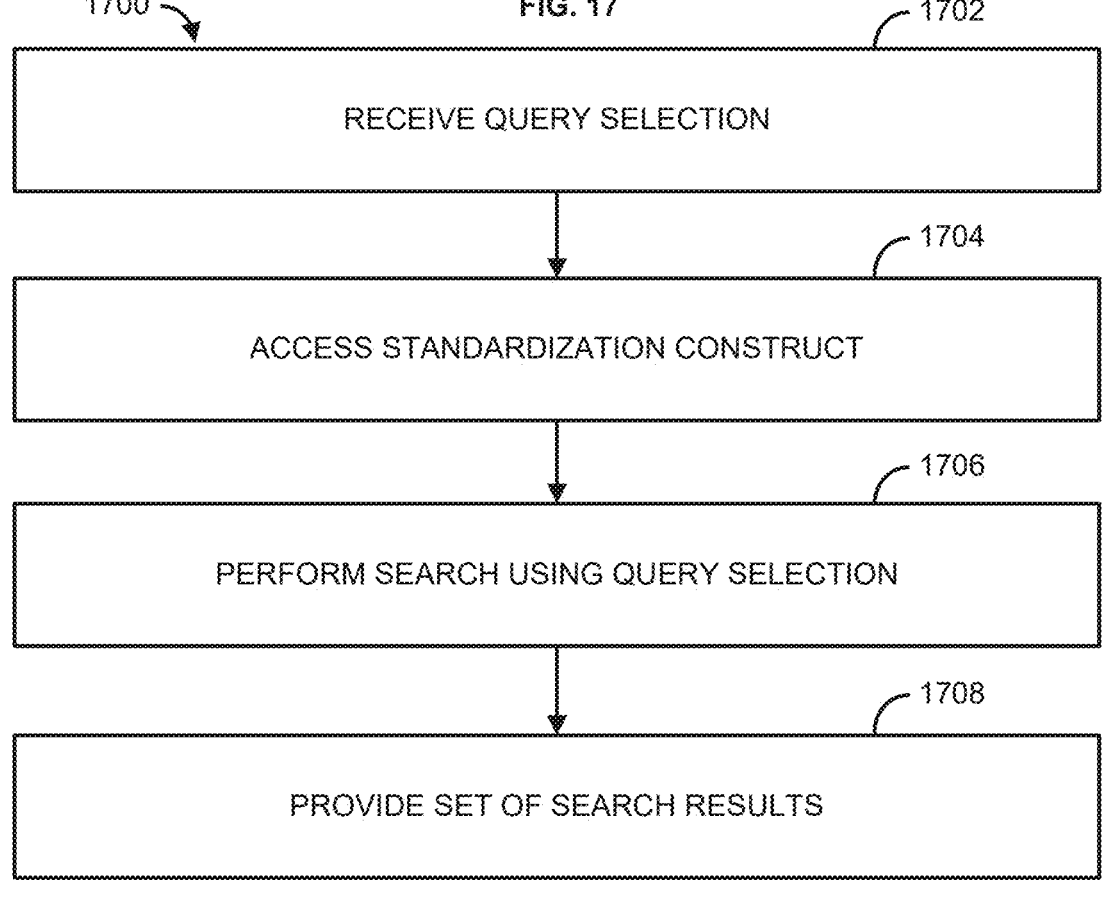
FIG. 17 shows a flowchart of an example method.

In an aspect, illustrated in FIG. 17, provided is a method 1700 comprising in step 1702, method 1700 receives a query selection. In step 1704, method 1700 accesses a standardization construct. In step 1706, method 1700 performs a search using the query selection and the standardization construct to generate a set of search results. In step 1708, method 1700 provides the set of search results. In some embodiments, a method may include receiving a query selection, accessing a standardization construct, performing a search using the query selection and the standardization construct to generate a set of search results, and/or providing the set of search results. In some embodiments, receiving a query selection may include receiving one or more keywords. In some embodiments, receiving a query selection may include receiving the search query via a hypertext transfer protocol. In some embodiments, the standardization construct may include a data structure configured for filtering the set of search results.

In some embodiments, the standardization construct may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries. In some embodiments, performing a search using the query selection and the standardization construct to generate a set of search results may include identifying one or more search results that include the query selection.

In some embodiments, performing a search using the query selection and the standardization construct to generate a set of search results may include determining a similarity between a data profile of the standardization construct to a data profile of each of the set of search results (e.g., a comparison of two or more organizations and/or entities). In some embodiments, performing a search using the query selection and the standardization construct to generate a set of search results may include identifying which of the set of search results comprise a keyword in common with a domain of the standardization construct. In some embodiments, performing a search using the query selection and the standardization construct to generate a set of search results may include determining a relevance of the set of search results to one or more keywords or concepts that comprise a domain of the standardization construct.

Figure 18:
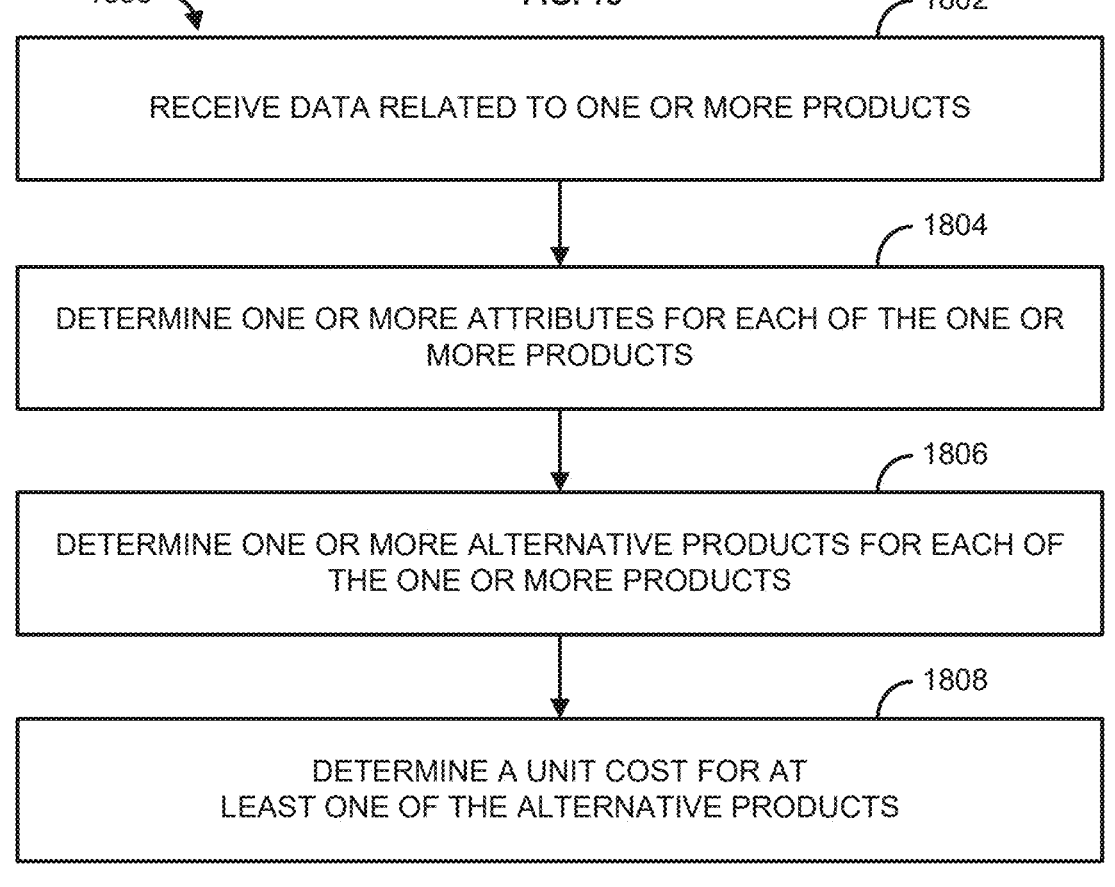
FIG. 18 shows a flowchart of an example method.

In an aspect, illustrated in FIG. 18, provided is a method 1800 comprising in step 1802, method 1800 receives data related to one or more products (e.g., inventor supplies). In step 1804, method 1800 determines one or more attributes for each of the one or more products (e.g., an active medication, a dosage, a size of an item, etc.). In an aspect determining the one or more attributes for each of the one or more products may further comprise determining a relationship between two or more the one or more products, thereby creating product clusters (e.g., using the clustering process described above). The method may further comprise performing a sanity check on the product clusters to ensure they are properly clustered (e.g., each product in a given cluster is related to all other products of the cluster). In step 1806, method 1800 determines or more alternative products for each of the one or more products based on the attributes. In step 1808, method 1800 determines a unit cost for at least one of the alternative products for an organization entity. The method may further comprise providing the determined unit cost(s) to a user.

In some embodiments, the data related to one or more products may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries. In some embodiments, performing a search using the query selection and the standardization construct to generate a set of search results may include identifying one or more search results that include the query selection.

Figure 19:
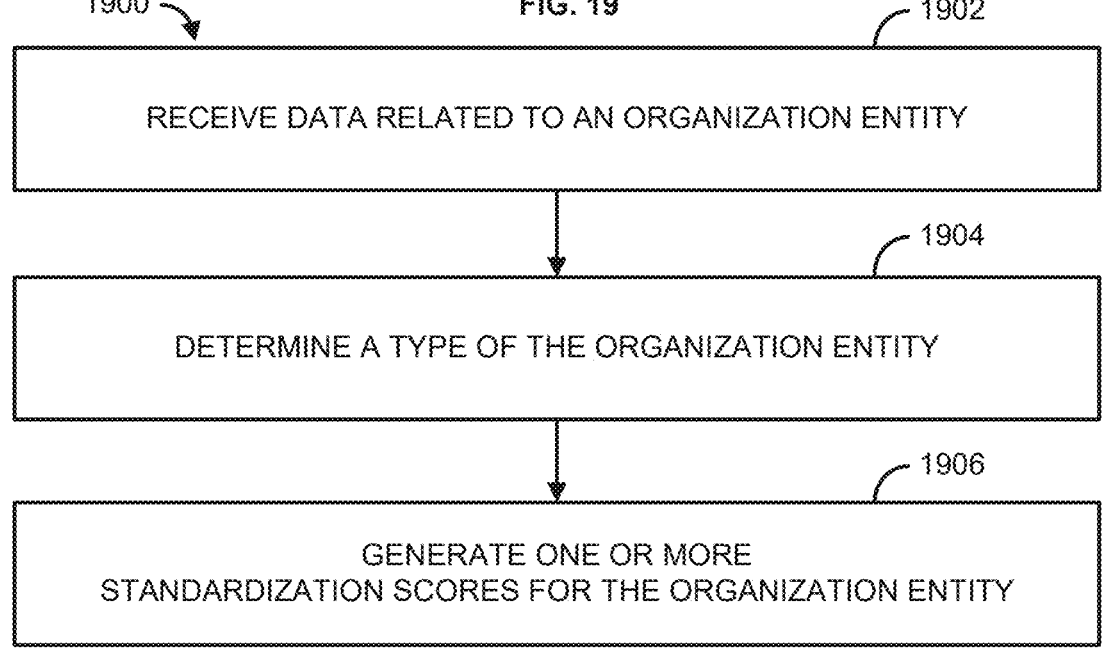
FIG. 19 shows a flowchart of an example method.

In an aspect, illustrated in FIG. 19, provided is a method 1900 comprising in step 1902, method 1900 receives data related to an organization entity. In step 1904, method 1900 determines a type associated with the organization entity (e.g., practice group, specialty, office, etc.). In step 1906, method 1900 generates one or more standardization scores (e.g., based on a generated standardization construct) for the organization entity. In some embodiments, the data related to an organization entity may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries. In some embodiments, performing a search using the query selection and the standardization construct to generate a set of search results may include identifying one or more search results that include the query selection.

Figure 20:
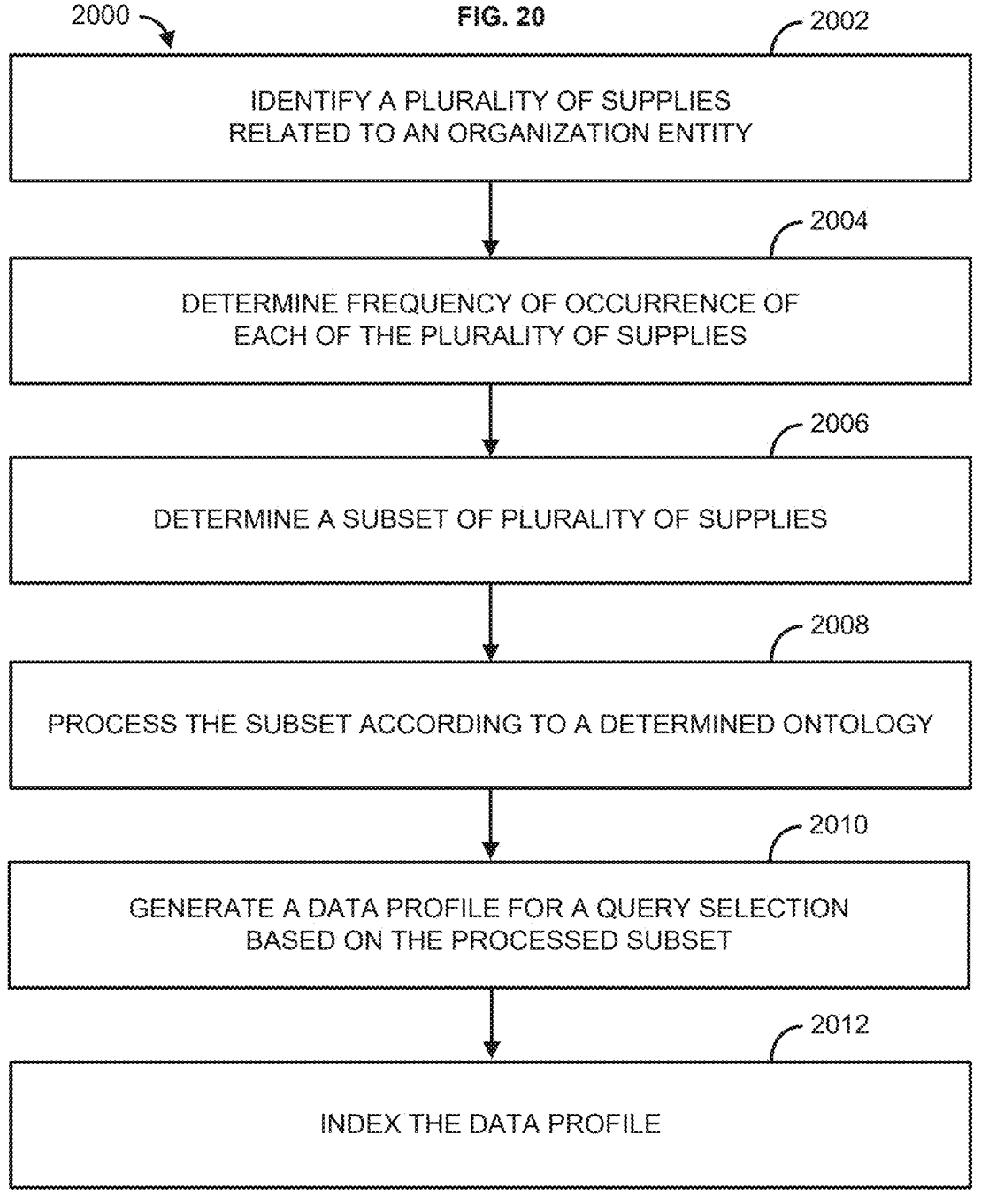
FIG. 20 shows a flowchart of an example method.

In an aspect, illustrated in FIG. 20, provided is a method 2000 comprising in step 2002, method 2000 identifies a plurality of supplies in data related to an organization entity (e.g., purchase order records, sales records, inventory records, etc.). In step 2004, method 2000 determines a frequency of occurrence of each of the plurality of supplies. In step 2006, method 2000 determines a subset of the plurality of supplies having a frequency of occurrence above a threshold. In step 2008, method 2000 processes the subset of the plurality of supplies according to an ontology (e.g., based on attributes of each of the supplies). In step 2010, method 2000 generates a data profile for a query selection based on the processed subset. In step 2012, method 2000 indexes the data profile. In some embodiments, the data related to one or more supplies may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

Figure 21:
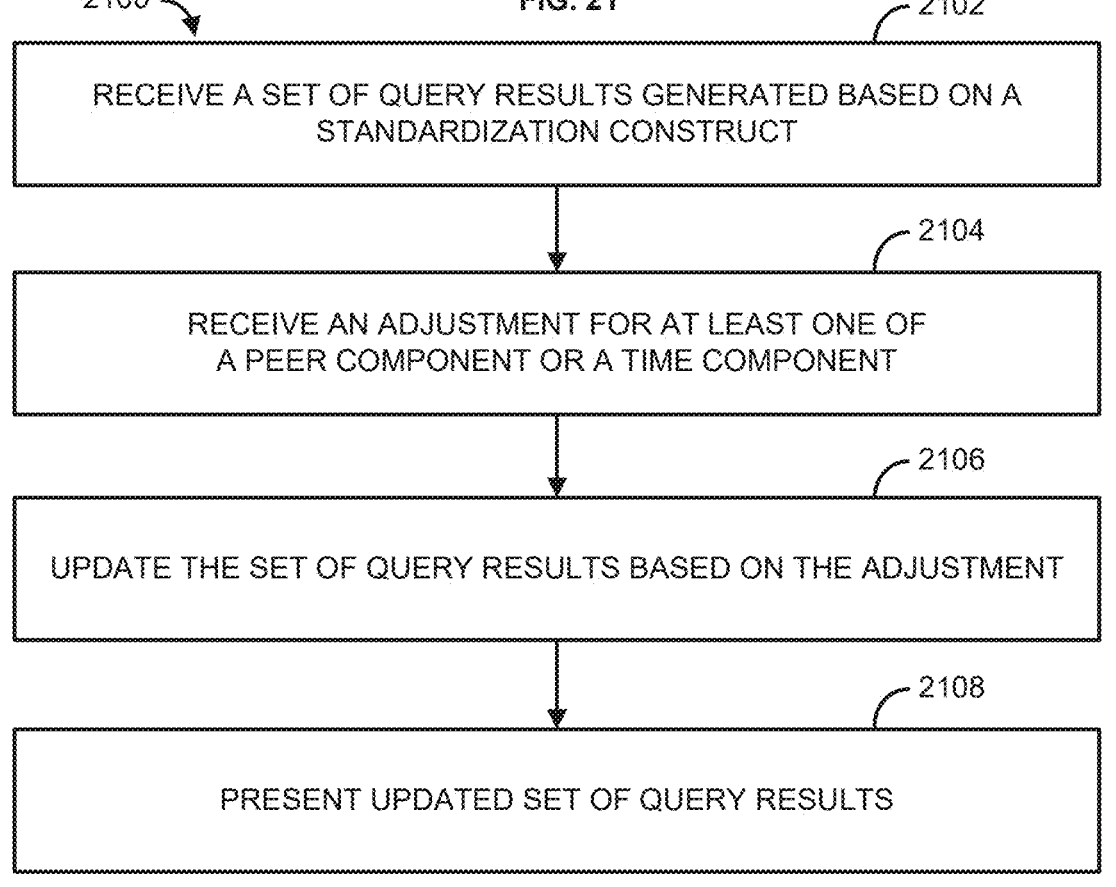
FIG. 21 shows a flowchart of an example method.

In an aspect, illustrated in FIG. 21, provided is a method 2100 comprising in step 2102, method 2100 receives a set of query results generated based on a standardization construct. In step 2104, method 2100 receives an adjustment to at least one of a peer component and a time component. In step 2106, method 2100 updates the set of query results based on the adjustment. In step 2108, method 2100 presents the updated set of query results. In some embodiments, the query results may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

Figure 22:
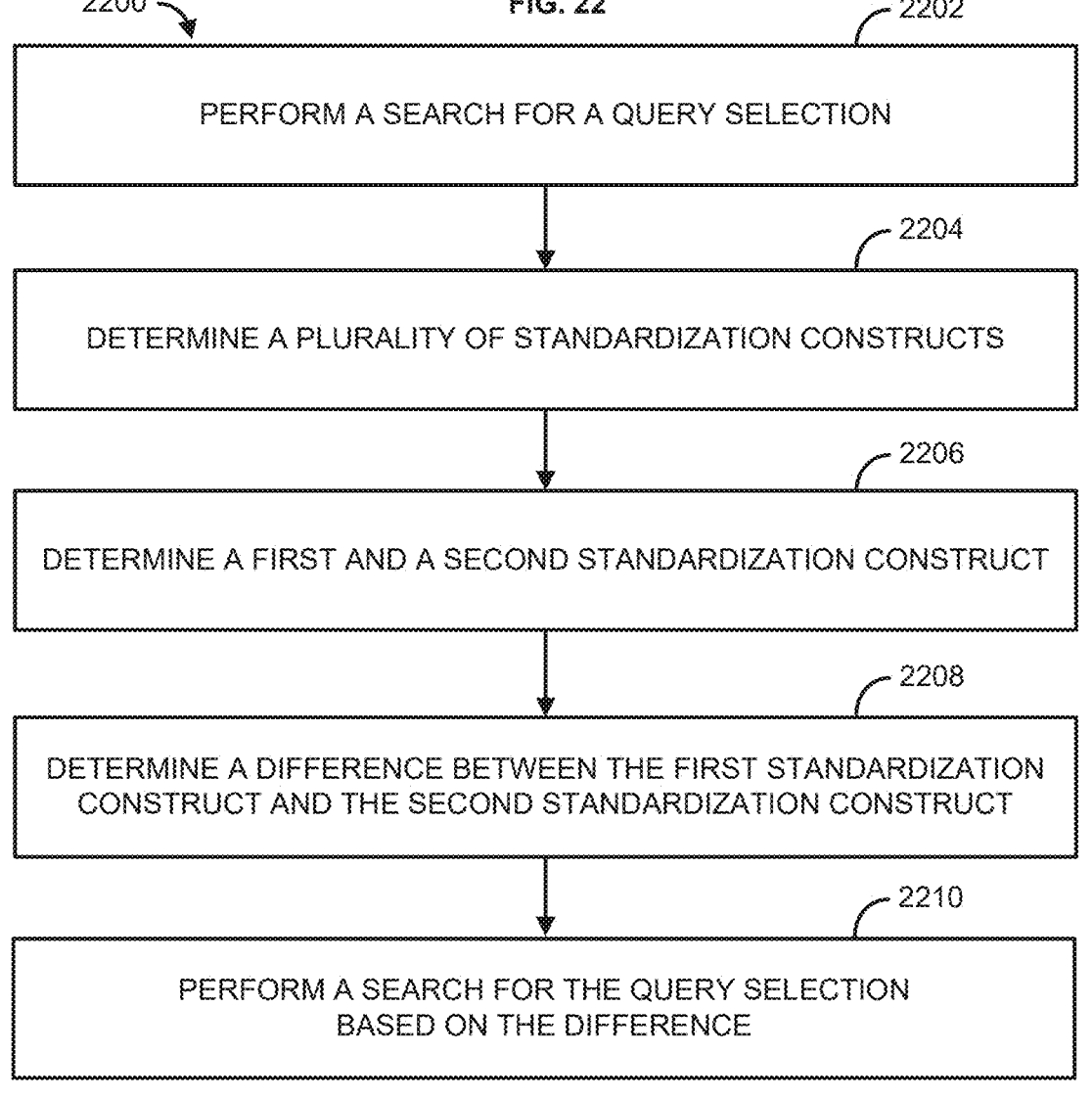
FIG. 22 shows a flowchart of an example method.

In an aspect, illustrated in FIG. 22, provided is a method 2200 comprising in step 2202, method 2200 performs a search for a first query selection based on a first standardization construct. In step 2204, method 2200 determines a plurality of standardization constructs that have also been used to perform a search for the first query selection. In step 2206, method 2200 determines a second standardization construct based on a commonality between the plurality of standardization constructs (e.g., based on a common type of organization, or entity thereof; a highest weight domain; a highest standardization rate for the domain, etc.). In step 2208, method 2200 determines a difference between the first standardization construct and the second standardization construct, resulting in a third standardization construct. In step 2210, method 2200 performs the search for the first query selection based on the third standardization construct. In some embodiments, performing the search for the first query selection based on the first standardization construct may include receiving a query type, accessing the first standardization construct, wherein the first standardization construct comprises organization data in a plurality of domains, determining a relevance of a search result to the query type, determining an applicability of a domain of the plurality of domains to the search result, and assigning a search result label to the search result based on the relevance and the applicability.

In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

In some embodiments, determining the plurality of standardization constructs that have also been used to perform the search for the first query selection may comprise accessing a database comprising the plurality of standardization constructs wherein each of the plurality of standardization constructs is associated with one or more previously performed search queries, determining a subset of the plurality of standardization constructs that previously performed the first search query, and retrieving the subset of the plurality of standardization constructs.

In some embodiments, determining the second standardization construct based on the commonality between the plurality of standardization constructs comprises determining one or more keywords and/or one or more concepts in common among the subset of the plurality of standardization constructs and assembling the one or more keywords and/or one or more concepts into the second standardization construct.

In some embodiments, determining the difference between the first standardization construct and the second standardization construct, resulting in the third standardization construct, comprises determining one or more keywords and/or concepts found in the first standardization construct that are not found in the second standardization construct and assembling the one or more keywords and/or concepts found in the first standardization construct that are not found in the second standardization construct into the third standardization construct.

In some embodiments, performing the search for the first search query based on the third standardization construct comprises receiving a query type, accessing the third standardization construct, wherein the third standardization construct comprises user data in a plurality of domains, determining a relevance of a search result to the query type, determining an applicability of a domain of the plurality of domains to the search result, and assigning a search result label to the search result based on the relevance and the applicability.

Figure 23:
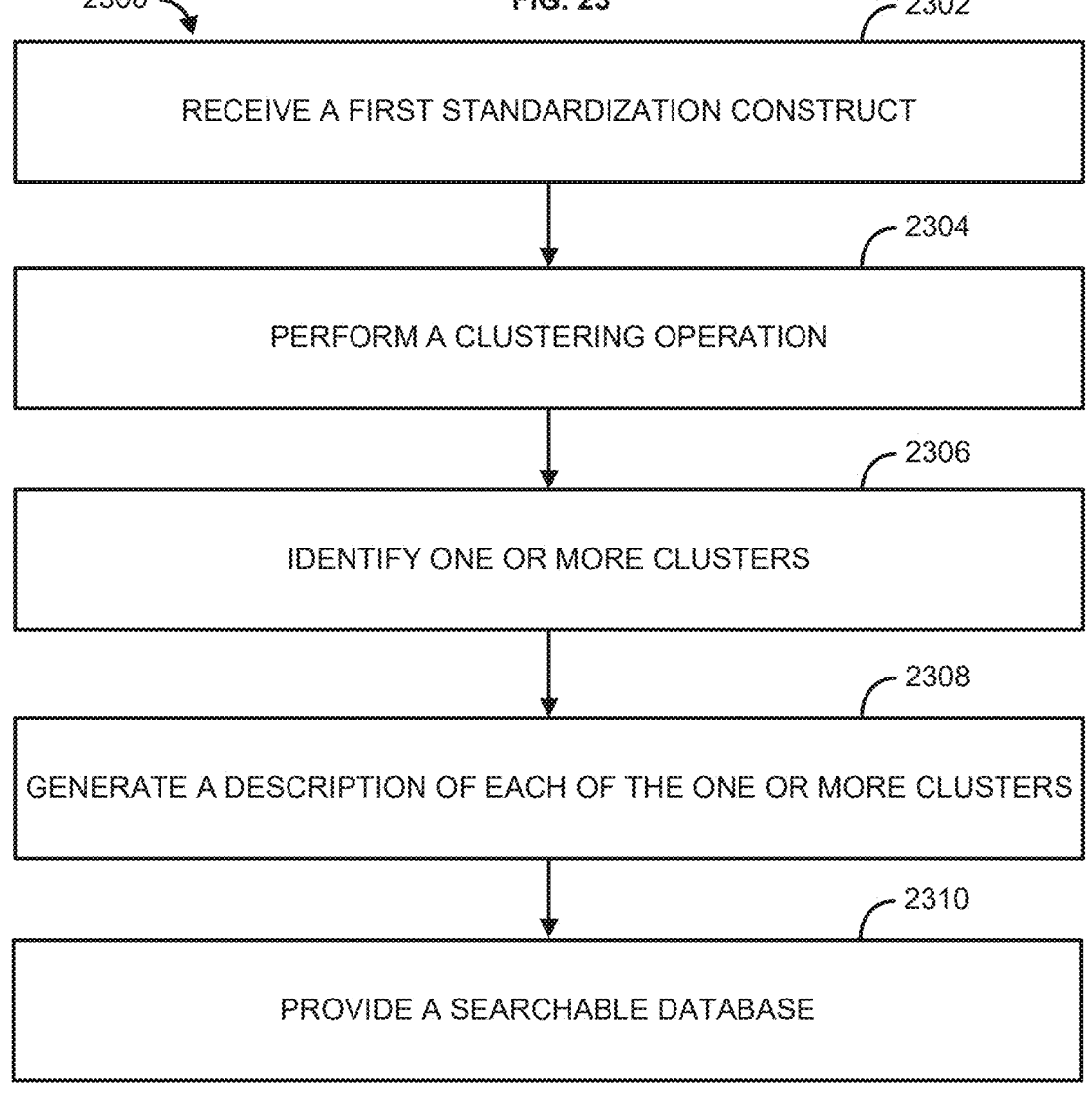
FIG. 23 shows a flowchart of an example method.

In an aspect, illustrated in FIG. 23, provided is a method 2300 comprising in step 2302, method 2300 receives a first standardization construct. In step 2304, method 2300 performs a clustering operation on the first standardization construct and a plurality of standardization constructs. In step 2306, method 2300 identifies one or more clusters that comprise one or more of the first standardization construct and the plurality of standardization constructs. In step 2308, method 2300 generates a description of each of the one or more clusters. In step 2310, method 2300 provides a searchable database comprising the description of each of the one or more clusters. In some embodiments, method 2300 may include receiving a first standardization construct, performing a clustering operation on the first standardization construct and a plurality of standardization constructs, identifying one or more clusters that comprise one or more of the first standardization construct and the plurality of standardization constructs, generating a description of each of the one or more clusters, and/or providing a searchable database.

In some embodiments, the data may include information related to an organization at a present state. In some embodiments, the data may include information related to an organization at a previous state. In some embodiments, the received batch information may include information related to an organization, or an entity thereof, at a present state. In some embodiments, the received batch information may include information related to an organization, or an entity thereof, at a previous state. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

In some embodiments, performing the clustering operation on the first standardization construct may include performing one or more of a hierarchical clustering operation, a k-means operation, and combinations thereof. In some embodiments, generating the description of each of the one or more clusters comprises generating a summary of domains shared amongst standardization constructs found within a cluster. In some embodiments, providing the searchable database comprising the description of each of the one or more clusters comprises providing a search interface configured for searching the searchable database according to one or more of an efficiency domain, an automation domain, a cost sourcing domain, an organization entity domain, etc. In some embodiments, the search interface is further configured for searching the searchable database according to at least one of a peer component and a time component.

Figure 24:
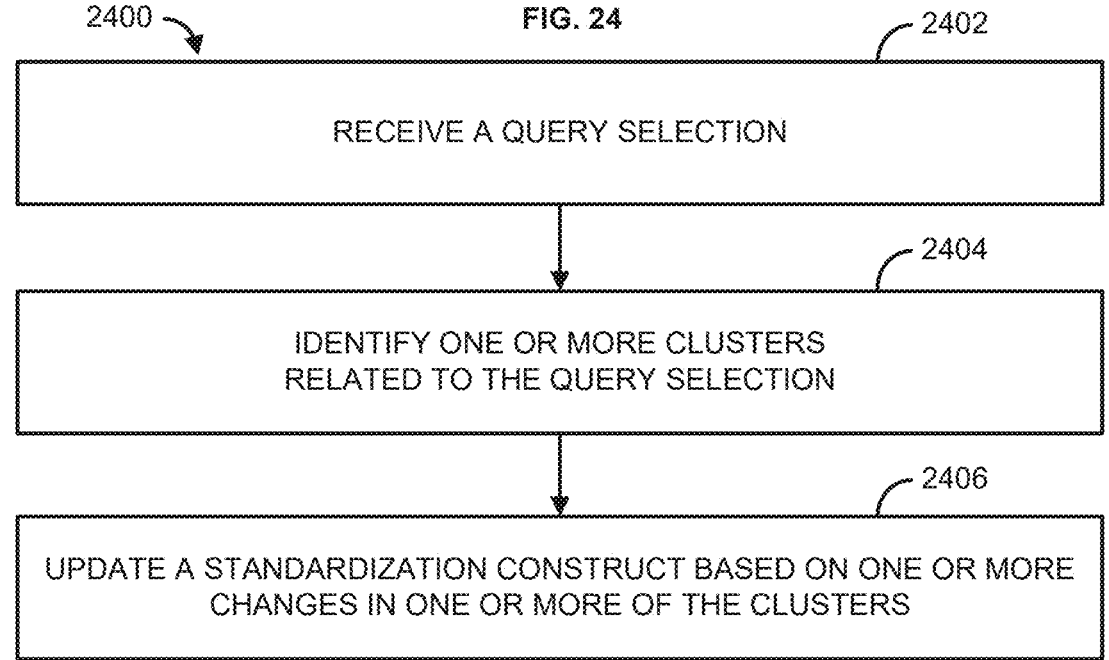
FIG. 24 shows a flowchart of an example method.

In an aspect, illustrated in FIG. 24, provided is a method 2400 comprising in step 2402, method 2400 receives a query selection (e.g., related to supplies/inventory stock). In step 2404, method 2400 identifies one or more clusters related to the query selection (e.g., clusters of products/supplies). In step 2406, method 2400 updates a standardization construct based on one or more changes in one or more of the clusters (e.g., based on a previously generated standardization construct and batch information subsequently received that is indicative of a change in acquisition of one or more supplies/inventory stock).

Figure 25:
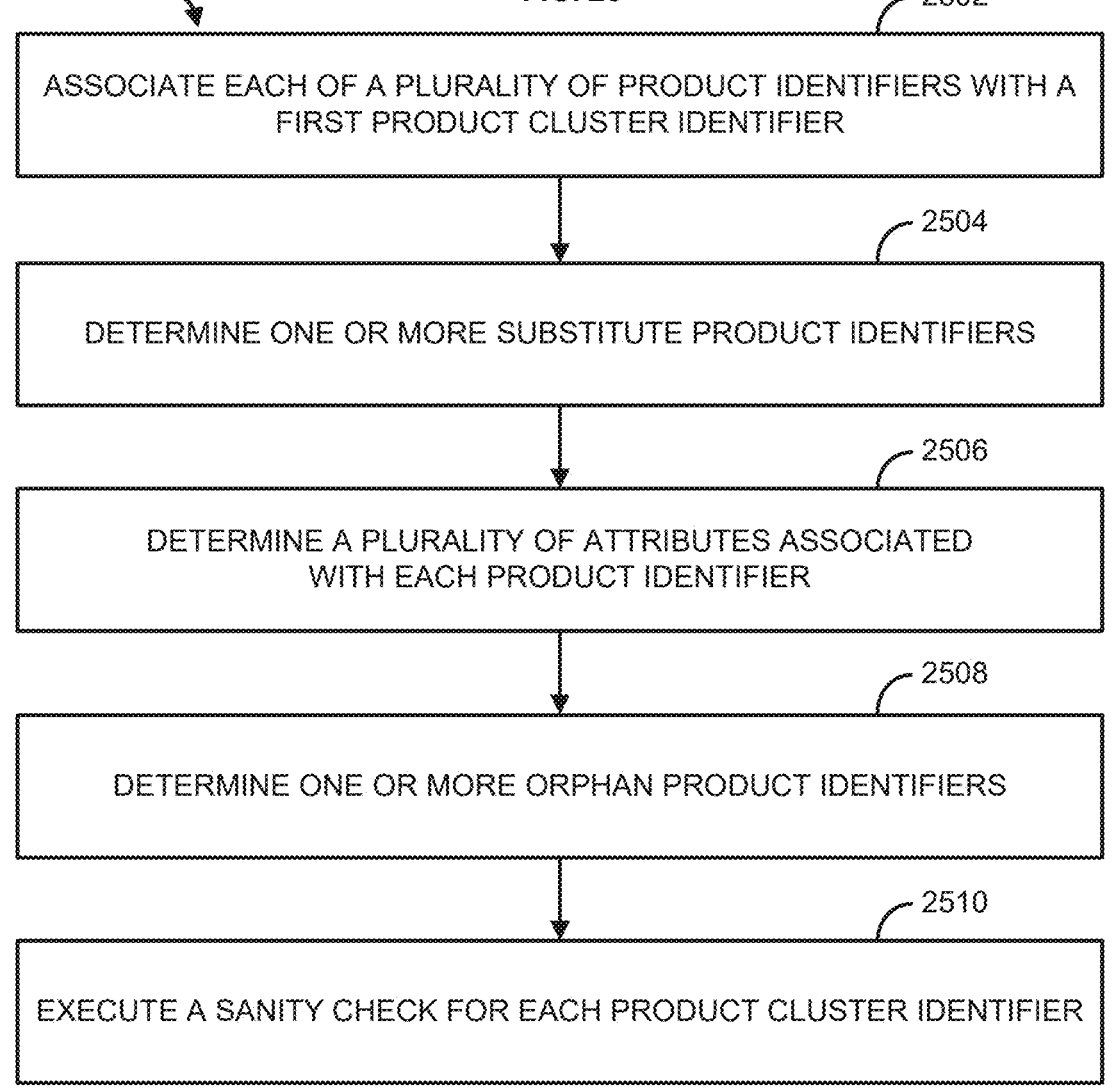
FIG. 25 shows a flowchart of an example method.

In an aspect, illustrated in FIG. 25, provided is a method 2500, which may be implemented using the server 102 and/or the analytics search engine 202. Method 2500 may be used to determine one or more product clusters associated with an organization entity. A product cluster may comprise a plurality of related products (e.g., medical supplies used by a medical services provider), each of which may be used to substitute one or more other products of the plurality (e.g., a cluster of tablet medications wherein each medication in the cluster is a low-level analgesic).

At step 2502, a first plurality of product identifiers each sharing a common attribute may be received by a computing device (e.g., server 102, client 106, etc.) from a database (e.g., a database stored on the server 102). The common attribute may be based on clinical equivalence, intended use, size, quantity, a combination thereof, and the like. At step 2504, the computing device may loop through the first plurality of product identifiers and associate each product identifier with a first product cluster identifier generated by the computing device. The first product cluster identifier may be associated with the common attribute (e.g., an identifier for a group of different brands of a type of latex gloves). At step 2506, the computing device may determine one or more substitute product identifiers for each product identifier associated with the first product cluster identifier (e.g., based on clinical equivalence and/or user/system-defined alternatives). The computing device may be associated each of the determined one or more substitute product identifiers with the first product cluster identifier, thereby increasing the number of product identifiers (e.g., substitute/alternative products) associated with the first product cluster identifier.

At step 2508, the computing device may determine a plurality of attributes associated with each product identifier associated with the first product cluster identifier (e.g., product name, type, amount, etc.). At step 2510, the computing device may repeat steps 2502-2508 for all other pluralities of product identifiers that are stored in the database to generate one or more additional product cluster identifiers. Each of the other pluralities of product identifiers may share a common attribute. At step 2512, the computing device may determine one or more orphan product identifiers not associated a product cluster identifier (e.g., not associated with the first cluster identifier or any of the one or more additional cluster identifiers). At step 2514, the computing device may execute a sanity check for each product cluster identifier. The sanity check for a given product cluster identifier may be based on one or more attributes associated with each product identifier in the given cluster (e.g., product category attribute for each product identifier in the given cluster). Based on the sanity checks executed for each product cluster identifier, the computing device may disassociate one or more product identifiers (e.g., one or more misclassified product identifiers) from a given product cluster identifier. Method 2500 may be performed by the computing device on a regular interval (e.g., hourly, daily, weekly, etc.).

Figure 26:
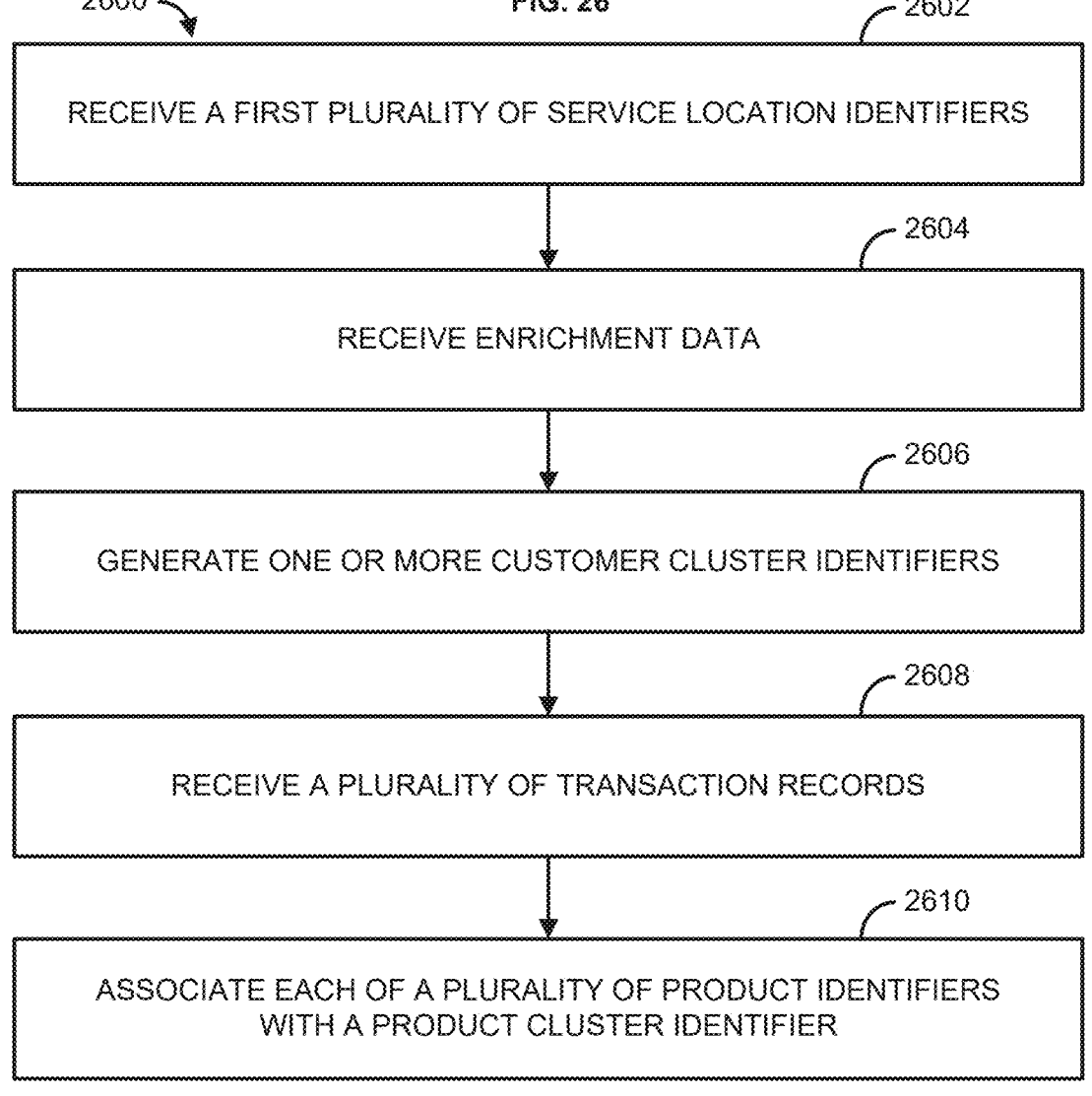
FIG. 26 shows a flowchart of an example method.

In an aspect, illustrated in FIG. 26, provided is a method 2600, which may be implemented using the server 102 and/or the analytics search engine 202. Method 2600 may be used to determine one or more customer clusters. A customer cluster may be associated with one or more service locations of an organization entity as described herein. At step 2602, a first plurality of service location identifiers associated with a first organization entity identifier may be received by a computing device (e.g., server 102, client 106, etc.) from a database (e.g., a database stored on the server 102). At step 2604, the computing device may receive (e.g., from the server 102, another computing device/database, etc.) enrichment data associated with the first organization entity identifier. The enrichment data may include a plurality of attributes associated with the first organization entity identifier (e.g., class of trade, ownership hierarchy, account classification, size, medical specialty, medical field, etc.). The enrichment data associated with the first organization entity identifier may be received by the computing device on a regular interval (e.g., hourly, daily, weekly, etc.). At step 2606, based on the enrichment data associated with the first organization entity identifier, the computing device may generate one or more customer cluster identifiers associated with the first organization entity identifier. Each of the one or more customer cluster identifiers may be associated with one or more service location identifiers (e.g., medical services provider locations) corresponding to the first organization entity identifier. Each of the one or more customer cluster identifiers may be associated with a plurality of common attributes (e.g., one or more attributes associated with the enrichment data for the first organization entity identifier).

At step 2608, the computing device may receive a plurality of transaction records (e.g., itemized purchase records) associated with the first organization entity identifier. The plurality of transaction records may be filtered by the computing device to remove transaction records associated with discounted purchases, returns, freight costs, credit back lines, etc. The plurality of transaction records may be associated with a duration of time (e.g., records for the last 90 days). The plurality of transaction records may each be associated with a service location identifier (e.g., a medical services provider location) corresponding to the first organization entity identifier. The plurality of transaction records may contain a plurality of product identifiers. At step 2610, the computing device may associate each product identifier with a product cluster identifier (e.g., as generated/determined by method 2500) based on a service location identifier corresponding to a given product identifier. Method 2600 may be performed by the computing device on a regular interval (e.g., hourly, daily, weekly, etc.).

In an aspect, illustrated in FIG. 27, provided is a method 2700, which may be implemented using the server 102 and/or the analytics search engine 202. Method 2700 may incorporate the steps of method 2500 and/or method 2600 to facilitate analysis and benchmarking of an organization entity. At step 2702, a computing device may receive a plurality of transaction records associated with a first organization entity identifier as described in method 2600. Based on the product clusters generated by method 2500 and the customer clusters generated by method 2600, at step 2704 the computing device may determine a per-unit cost for each product identifier (e.g., an atomic unit product cost) associated with the plurality of transaction records. At step 2704, the computing device may determine one or more alternative product identifiers for each product identifier associated with the plurality of transaction records (e.g., based on the product clusters generated by method 2500).

At step 2706, the computing device may generate (e.g., using a pricing engine on server 102) a plurality of alternative transactions based on the one or more alternative product identifiers for each product identifier associated with the plurality of transaction records. The plurality of alternative transactions may be representative of a cost differential based on a difference between a cost associated with the plurality of transaction records based on the per-unit cost of each product identifier (e.g., a total cost for all products previously purchased) and a cost associated with the plurality of transaction records based on the per-unit cost of each alternative product identifier (e.g., a total cost for all alternative products corresponding to the products previously purchased).

At step 2708, the computing device may determine a standardization construct for (e.g., as described above) based on the generated plurality of alternative transactions. The standardization construct may be associated with the first organization entity identifier. The standardization construct may be indicative of a comparison of the organization identity associated with the first organization entity identifier and one or more peer organization entities (e.g., based on common product clusters, customer clusters, class of trade, ownership hierarchy, account classification, size, medical specialty, medical field, etc.). The standardization construct may comprise a standardization score, which may be based on the plurality of transaction records and corresponding product purchases. As an example, purchases of multiple brands of a same type of product in a given product cluster may lower a standardization score, while purchases of a single brand of the product may increase a standardization score. The standardization construct may comprise a level of penetration of a brand associated with a plurality of product identifiers (e.g., purchases of multiple brands may lower a standardization, while purchases of one brand for a given group of products may increase the standardization). The standardization construct may comprise a level of purchase/order efficiency (e.g. standardization, while a single purchase of the product weekly may increase standardization due to savings on freight costs). The standardization construct may comprise a level of generic medical supplies purchased/ordered (e.g., a high level of generics purchased may increase standardization, while a low level of generics purchased may lower standardization). The standardization construct may comprise a level of order automation (e.g., purchases initiated over the phone may lower a standardization while purchases online may increase the standardization). The standardization construct may comprise a level of contract compliance score(s) (e.g., based on a level of purchases made from a contracted vendor. The standardization construct may comprise a level of peer/competitor popularity (e.g., a given product identifier may only be purchased by 10% of associated peer organization entities, which may lower standardization); and the like.

At step 2710, the computing device may generate a standardization construct as described above for each service location identifier corresponding to the first organization entity identifier (e.g., for each medical services provider location). At step 2712, the computing device may generate a plurality of rank levers associated with the first organization identity identifier. The plurality of rank levers may correspond to the various domains and weights described above with respect to the standardization construct 400 of FIG. 4 (e.g., product cost; order efficiency; formulary of product identifiers; product popularity among peers; contract compliance, etc.). Each of the plurality of rank levers may have an assigned weight that affects the standardization construct. For example, a rank lever with a high weight for order efficiency may have a greater negative effect on a standardization construct for an organization entity with a low level of order efficiency. At step 2714, the computing device may store the standardization construct for each service location identifier and/or the overall standardization construct for the organization entity in the database (e.g., of server 102) to facilitate access thereto via a user interface (e.g., any of the user interfaces described herein).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Figure 28:
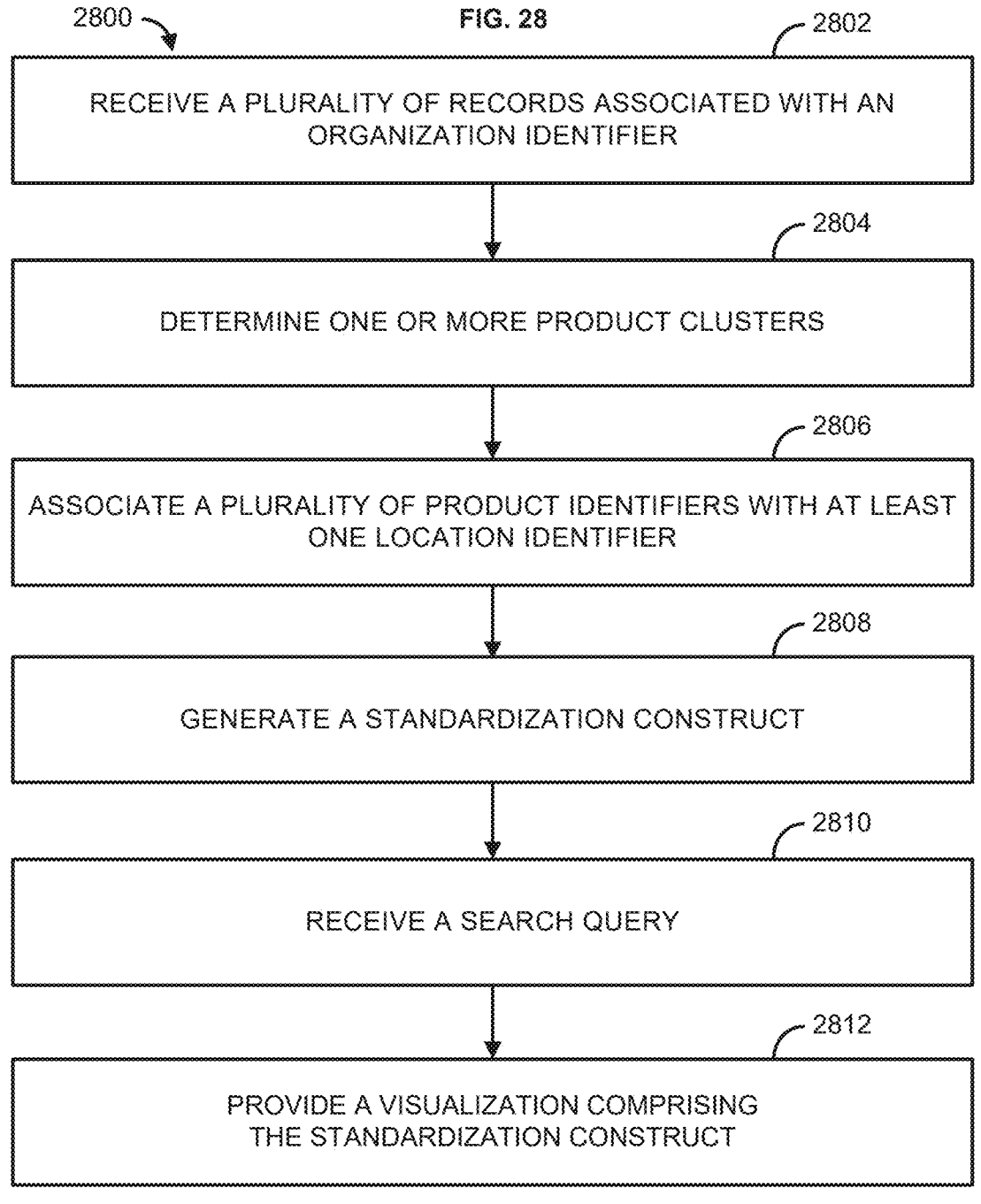
FIG. 28 shows a flowchart of an example method.

In an aspect, illustrated in FIG. 28, provided is a method 2800, which may be implemented using the server 102 and/or the analytics search engine 202. At step 2802, a computing device may receive a plurality of records associated with an organization identifier (e.g., a medical services provider). The organization identifier may be associated with at least one location identifier (e.g., an office/services location of the medical services provider). The plurality of records may comprise one or more transaction records (e.g., itemized purchase records) associated with the organization entity identifier. The plurality of transaction records may be filtered by the computing device to remove transaction records associated with discounted purchases, returns, freight costs, credit back lines, etc. The plurality of transaction records may be associated with a duration of time (e.g., records for the last 90 days). The plurality of transaction records may each be associated with a service location identifier (e.g., a medical services provider location) corresponding to the first organization entity identifier. The plurality of transaction records may contain a plurality of product identifiers.

At step 2804, one or more product clusters may be determined (e.g., based on the plurality of records). A product cluster may comprise a plurality of related products (e.g., medical supplies used by a medical services provider), each of which may be used to substitute one or more other products of the plurality (e.g., a cluster of tablet medications wherein each medication in the cluster is a low-level analgesic). The one or more product clusters may each comprise one or more related product identifiers. Determining the one or more product clusters may comprise receiving (e.g., from a database stored on the server 102) a first plurality of product identifiers each sharing a common attribute. The common attribute may be based on clinical equivalence, intended use, size, quantity, a combination thereof, and the like. The computing device may loop through the first plurality of product identifiers and associate each product identifier with a first product cluster identifier generated by the computing device. The first product cluster identifier may be associated with the common attribute (e.g., an identifier for a group of different brands of a type of latex gloves). The computing device may determine one or more substitute product identifiers for each product identifier associated with the first product cluster identifier (e.g., based on clinical equivalence and/or user/system-defined alternatives). The computing device may be associated each of the determined one or more substitute product identifiers with the first product cluster identifier, thereby increasing the number of product identifiers (e.g., substitute/alternative products) associated with the first product cluster identifier.

The computing device may determine a plurality of attributes associated with each product identifier associated with the first product cluster identifier (e.g., product name, type, amount, etc.). The computing device may generate one or more additional product cluster identifiers for all other pluralities of product identifiers that are stored in the database. Each of the other pluralities of product identifiers may share a common attribute. The computing device may determine one or more orphan product identifiers not associated a product cluster identifier (e.g., not associated with the first cluster identifier or any of the one or more additional cluster identifiers). The computing device may execute a sanity check for each product cluster identifier. The sanity check for a given product cluster identifier may be based on one or more attributes associated with each product identifier in the given cluster (e.g., product category attribute for each product identifier in the given cluster). Based on the sanity checks executed for each product cluster identifier, the computing device may disassociate one or more product identifiers (e.g., one or more misclassified product identifiers) from a given product cluster identifier. Step 2804 may be performed by the computing device on a regular interval (e.g., hourly, daily, weekly, etc.).

At step 2806, the computing device may associate each product identifier with a product cluster identifier (e.g., as generated/determined at step 2804) based on a service location identifier corresponding to a given product identifier. A first plurality of service location identifiers associated with a first organization entity identifier may be received by the computing device from the database. The computing device may receive enrichment data associated with the first organization entity identifier. The enrichment data may include a plurality of attributes associated with the first organization entity identifier (e.g., class of trade, ownership hierarchy, account classification, size, medical specialty, medical field, etc.). The enrichment data associated with the first organization entity identifier may be received by the computing device on a regular interval (e.g., hourly, daily, weekly, etc.). Based on the enrichment data associated with the first organization entity identifier, the computing device may generate one or more customer cluster identifiers associated with the first organization entity identifier. Each of the one or more customer cluster identifiers may be associated with one or more service location identifiers (e.g., medical services provider locations) corresponding to the first organization entity identifier. Each of the one or more customer cluster identifiers may be associated with a plurality of common attributes (e.g., one or more attributes associated with the enrichment data for the first organization entity identifier). Step 2806 may be performed by the computing device on a regular interval (e.g., hourly, daily, weekly, etc.).

At step 2808, the computing device may generate a standardization construct for each service location identifier corresponding to the first organization entity identifier (e.g., for each medical services provider location). The computing device may determine a per-unit cost for each product identifier (e.g., an atomic unit product cost) associated with the plurality of transaction records. The computing device may determine one or more alternative product identifiers for each product identifier associated with the plurality of transaction records (e.g., based on the product clusters determined at step 2804). The computing device may generate (e.g., using a pricing engine on server 102) a plurality of alternative transactions based on the one or more alternative product identifiers for each product identifier associated with the plurality of transaction records. The plurality of alternative transactions may be representative of a cost differential based on a difference between a cost associated with the plurality of transaction records based on the per-unit cost of each product identifier (e.g., a total cost for all products previously purchased) and a cost associated with the plurality of transaction records based on the per-unit cost of each alternative product identifier (e.g., a total cost for all alternative products corresponding to the products previously purchased).

The computing device may generate the standardization construct based on the generated plurality of alternative transactions. The standardization construct may be associated with the first organization entity identifier. The standardization construct may be indicative of a comparison of the organization identity associated with the first organization entity identifier and one or more peer organization entities (e.g., based on common product clusters, customer clusters, class of trade, ownership hierarchy, account classification, size, medical specialty, medical field, etc.). The standardization construct may comprise a standardization score, which may be based on the plurality of transaction records and corresponding product purchases. As an example, purchases of multiple brands of a same type of product in a given product cluster may lower a standardization score, while purchases of a single brand of the product may increase a standardization score. The standardization construct may comprise a level of penetration of a brand associated with a plurality of product identifiers (e.g., purchases of multiple brands may lower a standardization, while purchases of one brand for a given group of products may increase the standardization). The standardization construct may comprise a level of purchase/order efficiency (e.g. standardization, while a single purchase of the product weekly may increase standardization due to savings on freight costs). The standardization construct may comprise a level of generic medical supplies purchased/ordered (e.g., a high level of generics purchased may increase standardization, while a low level of generics purchased may lower standardization). The standardization construct may comprise a level of order automation (e.g., purchases initiated over the phone may lower a standardization while purchases online may increase the standardization). The standardization construct may comprise a level of contract compliance score(s) (e.g., based on a level of purchases made from a contracted vendor. The standardization construct may comprise a level of peer/competitor popularity (e.g., a given product identifier may only be purchased by 10% of associated peer organization entities, which may lower standardization); and the like. In some embodiments, the standardization construct may include data relating to a plurality of domains. In some embodiments, the domain may include an efficiency domain, an automation domain, a cost sourcing domain, an organization entity domain, etc. In some embodiments, the weight may include a value indicative of an importance of the domain. In some embodiments, the peer component may include a value indicative of a level of relative achievement of an organization, or an entity thereof, associated with the data as compared to one or more peer entities. In some embodiments, the time component may include a value indicative of an amount of time associated with the data. In some embodiments, the standardization construct may include a data structure configured for filtering one or more search results and/or one or more search queries.

The computing device may generate a plurality of rank levers associated with the first organization identity identifier. The plurality of rank levers may correspond to various domains and weights described above with respect to the standardization construct 400 of FIG. 4 (e.g., product cost; order efficiency; formulary of product identifiers; product popularity among peers; contract compliance, etc.). Each of the plurality of rank levers may have an assigned weight that affects the standardization construct. For example, a rank lever with a high weight for order efficiency may have a greater negative effect on a standardization construct for an organization entity with a low level of order efficiency. The computing device may store the standardization construct for each service location identifier and/or the overall standardization construct for the organization entity in the database (e.g., of server 102) to facilitate access thereto via a user interface (e.g., any of the user interfaces described herein).

At step 2810, a search query comprising the organization identifier may be received by the computing device via a user interface (e.g., user interface 1000). The computing device may provide the search query to a first search engine and receive a first set of search results from the first search engine. In some embodiments, providing the search query to the first search engine may include receiving a first set of search results from the first search engine, accessing a standardization construct, filtering the first set of search results with the standardization construct to generate a second set of search results, and/or providing the second set of search results. In some embodiments, receiving the query selection may include receiving one or more keywords. In some embodiments, providing the query selection to the first search engine may include passing the query selection to the first search engine via a hypertext transfer protocol. In some embodiments, receiving the first set of search results from the first search engine may include receiving the first set of search results via a hypertext transfer protocol.

At step 2812, a visualization comprising the standardization construct associated with the at least one location identifier may be provided at the user interface. The visualization may be formatted similar to the user interface screen 1000 of FIG. 10, which illustrates an example of search results based on the standardization construct 900 provided in FIG. 9. For example, the search results 1006 for "Care Setting by Specialty" may comprise a graphical depiction of standardization rates and other data related to an organization. In an aspect, the standardization construct 900 may be modified after the search has been conducted to modify the search results 1006. For example, the time component 916 of "7" for the domain 908 could be modified post-search to a "10." The result would be to identify potential standardization rates for an entity (e.g., based on changes that affect the particular domain). Any aspect of a standardization construct may be modified post-search to allow a user to adjust the search results and fine tune the search results to the user's liking. For example, a user may add/delete a domain, add/delete organization data contained within a domain, modify a weight of a domain and/or organization data, modify a time component of a domain and/or organization data, modify a peer component of a domain and/or organization data, combinations thereof, and the like. For example, the computing device may receive an adjustment to at least one of a peer component and a time component associated with the standardization construct. The computing device may update the query results based on the adjustment and present an updated visualization.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

determining, by a first computing device, based on a plurality of records associated with an organization identifier, a plurality of product clusters, wherein each product cluster of the plurality of product clusters comprises one or more product identifiers;

generating, based on a product cost associated with the one or more product identifiers within each of the plurality of product clusters, and based on a substitute cost associated with one or more substitute product identifiers associated with the one or more product identifiers within each of the plurality of product clusters, a plurality of alternative transactions indicative of a cost differential between the product cost and the substitute cost;

generating, based on the plurality of alternative transactions indicative of the cost differential, a standardization construct;

based on a search query comprising the organization identifier, outputting, at a user interface, search results and an adjustable visualization based on the standardization construct; and based on at least one user interaction with the adjustable visualization via the user interface:

modifying the standardization construct, resulting in a modified standardization construct, wherein the standardization construct is modified based on at least one alternative transaction, of the plurality of alternative transactions, associated with the at least one user interaction, and outputting, based on the modified standardization construct, modified search results.

2. The method of claim 1, wherein the plurality of records comprises the one or more product identifiers within each product cluster of the plurality of product clusters.

3. The method of claim 1, wherein generating the standardization construct comprises, for each product cluster of the plurality of product clusters, determining the product cost associated with each of the one or more product identifiers.

4. The method of claim 1, wherein generating the standardization construct comprises, for each product cluster of the plurality of product clusters, determining the substitute cost associated with each of the one or more substitute product identifiers.

5. The method of claim 1, wherein the adjustable visualization comprises a time component, a weight, or a peer component.

6. The method of claim 5, wherein the at least one user interaction comprises an adjustment to the time component, the weight, or the peer component, and wherein the modified search results are based on the adjustment.

7. The method of claim 1, wherein the adjustable visualization comprises one or more of a chart or a graph indicative of the cost differential for each product cluster of the plurality of product clusters.

8. A non-transitory computer-readable storage medium comprising computer-executable instructions that, when executed by a computing device, cause the computing device to:

determine, by a first computing device, based on a plurality of records, a plurality of product clusters associated with an organization identifier, wherein each product cluster of the plurality of product clusters comprises one or more product identifiers;

generate, based on a product cost associated with the one or more product identifiers within each of the plurality of product clusters, and based on a substitute cost for one or more substitute product identifiers associated with the one or more product identifiers within each of the plurality of product clusters, a plurality of alternative transactions indicative of a cost differential between the product cost and the substitute cost;

generate, based on the plurality of alternative transactions indicative of the cost differential, a standardization construct;

based on a search query comprising the organization identifier, output, at a user interface, search results and an adjustable visualization based on the standardization construct; and based on at least one user interaction with the adjustable visualization via the user interface:

modify the standardization construct, resulting in a modified standardization construct, wherein the standardization construct is modified based on at least one alternative transaction, of the plurality of alternative transactions, associated with the at least one user interaction, and output, based on the modified standardization construct, modified search results.

9. The non-transitory computer-readable storage medium of claim 8, wherein the plurality of records comprises the one or more product identifiers within each product cluster of the plurality of product clusters.

10. The non-transitory computer-readable storage medium of claim 8, wherein the computer-executable instructions that, when executed by the computing device, cause the computing device to generate the standardization construct further cause the computing device to, for each product cluster of the plurality of product clusters, determine the product cost associated with each of the one or more product identifiers.

11. The non-transitory computer-readable storage medium of claim 8, wherein the computer-executable instructions that, when executed by the computing device, cause the computing device to generate the standardization construct further cause the computing device to, for each product cluster of the plurality of product clusters, determine the substitute cost associated with each of the one or more substitute product identifiers.

12. The non-transitory computer-readable storage medium of claim 8, wherein the adjustable visualization comprises a time component, a weight, or a peer component.

13. The non-transitory computer-readable storage medium of claim 12, wherein the at least one user interaction comprises an adjustment to the time component, the weight, or the peer component, and wherein the modified search results are based on the adjustment.

14. The non-transitory computer-readable storage medium of claim 8, wherein the adjustable visualization of the standardization construct comprises one or more of a chart or a graph indicative of the cost differential for each product cluster of the plurality of product clusters.

15. An apparatus comprising:

one or more processors; and memory storing processor-executable instructions that, when executed by the one or more processors, cause the apparatus to:

determine, based on a plurality of records, a plurality of product clusters associated with an organization identifier, wherein each product cluster of the plurality of product clusters comprises one or more product identifiers;

generate, based on a product cost associated with the one or more product identifiers within each of the plurality of product clusters, and based on a substitute cost for one or more substitute product identifiers associated with the one or more product identifiers within each of the plurality of product clusters, a plurality of alternative transactions indicative of a cost differential between the product cost and the substitute cost;

generate, based on the plurality of alternative transactions indicative of the cost differential, a standardization construct;

based on a search query comprising the organization identifier, output, at a user interface, search results and an adjustable visualization based on the standardization construct; and based on at least one user interaction with the adjustable visualization via the user interface:

modify the standardization construct, resulting in a modified standardization construct, wherein the standardization construct is modified based on at least one alternative transaction, of the plurality of alternative transactions, associated with the at least one user interaction, and, output, based on the modified standardization construct, modified search results.

16. The apparatus of claim 15, wherein the plurality of records comprises the one or more product identifiers within each product cluster of the plurality of product clusters.

17. The apparatus of claim 15, wherein the processor-executable instructions that, when executed by the apparatus, cause the apparatus to generate the standardization construct further cause the apparatus to, for each product cluster of the plurality of product clusters, determine the product cost associated with each of the one or more product identifiers.

18. The apparatus of claim 15, wherein the processor-executable instructions that, when executed by the apparatus, cause the apparatus to generate the standardization construct further cause the apparatus to, for each product cluster of the plurality of product clusters, determine the substitute cost associated with each of the one or more substitute product identifiers.

19. The apparatus of claim 15, wherein the adjustable visualization comprises a time component, a weight, or a peer component.

20. The apparatus of claim 19, wherein the at least one user interaction comprises an adjustment to the time component, the weight, or the peer component, and wherein the modified search results are based on the adjustment.

* * * * *